RALPH KENT CROOKS
JAMES M. HARDENBROOK
RICHARD D. LEIS
JAMES C. SWAIN
DAVID L. THOMAS
   INVENTORS

RALPH KENT CROOKS
JAMES M. HARDENBROOK
RICHARD D. LEIS
JAMES C. SWAIN
DAVID L. THOMAS
INVENTORS

May 7, 1968     R. K. CROOKS ET AL     3,381,485
GENERAL PURPOSE UNDERWATER MANIPULATING SYSTEM
Filed Oct. 23, 1965     13 Sheets-Sheet 4

RALPH KENT CROOKS
JAMES M. HARDENBROOK
RICHARD D. LEIS
JAMES C. SWAIN
DAVID L. THOMAS
                  INVENTORS

BY *Graf, Mase and Dunson* Attorneys

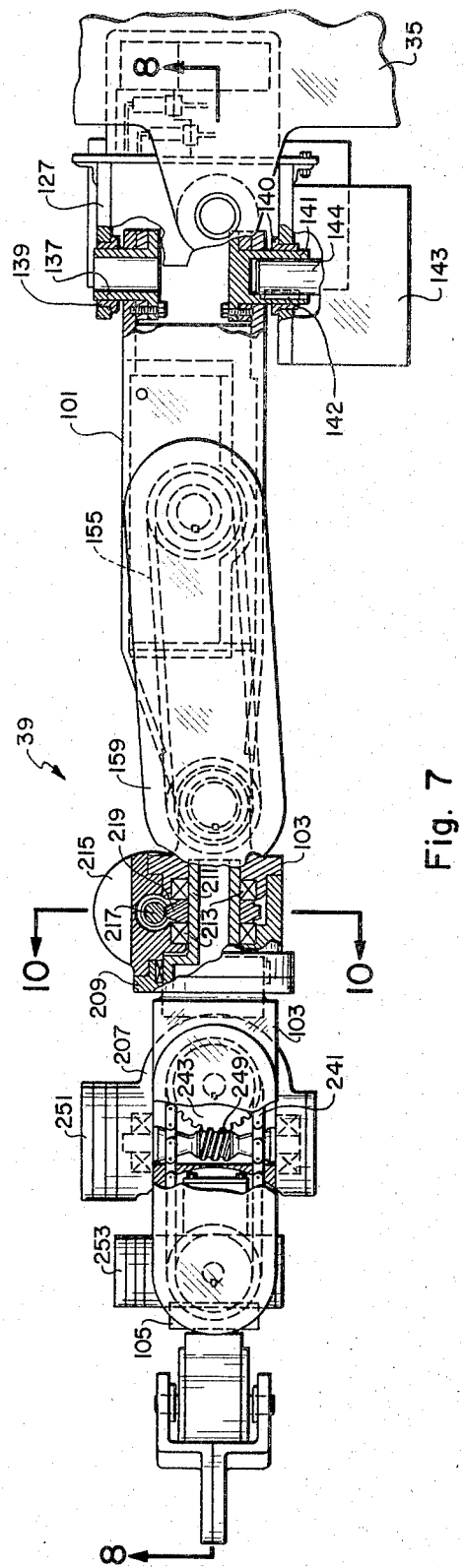

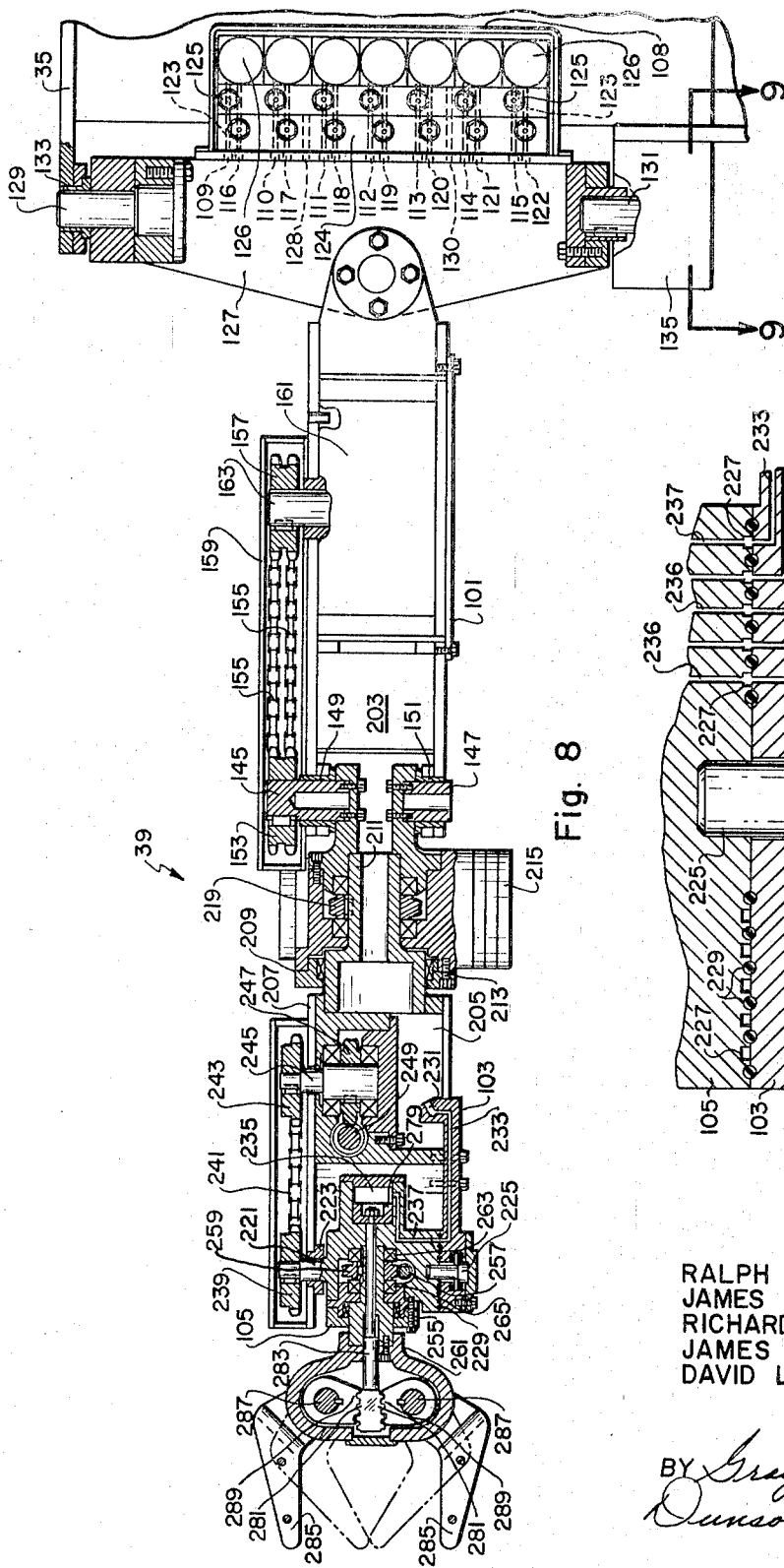

RALPH KENT CROOKS
JAMES M. HARDENBROOK
RICHARD D. LEIS
JAMES C. SWAIN
DAVID L. THOMAS
INVENTORS

BY Gray, Mase and
Dunson Attorneys

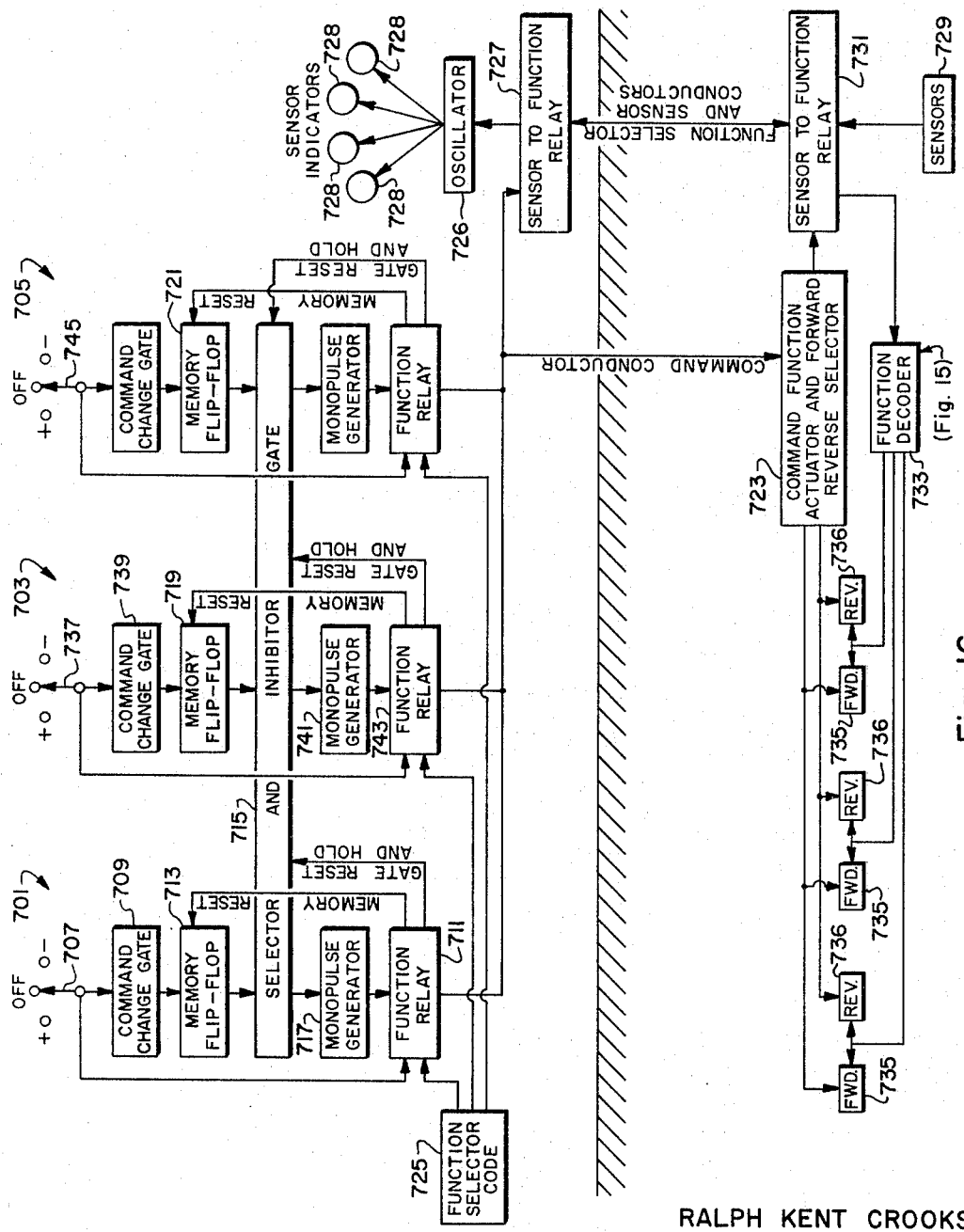

United States Patent Office

3,381,485
Patented May 7, 1968

3,381,485
GENERAL PURPOSE UNDERWATER
MANIPULATING SYSTEM
Ralph K. Crooks, James M. Hardenbrook, Richard D. Leis, James C. Swain, and David L. Thomas, Columbus, Ohio, assignors, by mesne assignments, to The Battelle Development Corporation, Columbus, Ohio, a corporation of Delaware
Filed Oct. 23, 1965, Ser. No. 503,952
9 Claims. (Cl. 61—69)

ABSTRACT OF THE DISCLOSURE

A cable-suspended, remote-controlled manipulating device for operation underwater. The apparatus includes propulsion means, TV camera, clamping devices, manipulating arm, support feet and other devices necessary to underwater operation. Numerous components of the apparatus are preferably hydraulically actuated by a system having a plurality of capacity or power levels. Various sensor devices are included to obtain information about underwater environment and to inform the above-water operator of the condition and activity of the apparatus. The apparatus is constructed in modules to facilitate replacement and substitution of various working devices. The command system of the device includes partial multiplexing where signals are originated by an operator and released to the underwater apparatus on a priority system with lag time within the area of human reaction time. Sensor signals and command signals are sent along common channels.

---

This invention relates to apparatus for underwater exploration, research, and remote controlled manipulation of various devices and tools. More particularly, it concerns a fully controlled, uninhabited apparatus provided with television and operated by a command station that is preferably situated on a craft above water.

Much of the world's wealth and resources lie on or beneath the floor of the ocean. Under present engineering capabilities, these resources are largely inaccessible. Interest is developing, and some experiments have been conducted, in mining, farming the ocean floor, and under sea dwellings; also, there has been very active development of off-shore oil reserves throughout the world. Under 20 to 300 fathoms of ocean water lie broad continental shelves which in themselves constitute nearly fifteen percent of the earth's total surface. When these continental shelves come within the reach of man, the total area that mankind can utilize for its benefit will more than double. High pressure, the corrosive nature of sea water, and many other factors combine to make the ocean a hostile environment in which man has, to date, operated only in a limited way.

In the past, deep-sea exploration and research has been limited by man's inability to reach deep enough into the ocean and remain there long enough to accomplish given tasks. Two principal concepts of deep-sea penetration are: (1) attempts to put man deep into the ocean by scuba apparatus, hard helmets or aboard submersibles, and (2) unmanned dredges and trawls or programmed machine systems.

Recently, especially with development of improved television devices, interest has increased in remote controlled manipulators. Considerable success is being achieved in increasing the economic productivity of divers at depths exceeding 100 feet or so; nevertheless, an expanding need for remote controlled equipment to complement or supplement the work of divers is still needed. The apparatus of this invention is intended for use in the growing underwater science, to increase the knowledge in that science and for application in present common underwater operations such as general underwater observations, search, repair, salvage and other tasks requiring manipulatory functions.

A variety of remote controlled craft have been proposed and a smaller number built. In general, these have been very complex in structure but limited in function. The present invention is directed to the need for a structurally simple, but reasonably versatile, device that can operate at continental shelf depths, and deeper, and perform a variety of manual tasks. To accomplish this, a vehicle suspended by a cable from a floating vessel is preferred since cable suspension eliminates a number of complex problems inherent in a freely swimming vehicle.

Conventional remote-controlled underwater craft have usually emphasized certain functions while neglecting others. Most conventional devices have been impractical in the area of ability to orient and maintain orientation of the device with respect to tasks to be performed. Other conventional devices provide great mobility with seemingly ample controls but neglect to consider cable requirements for the large number of communication lines involved. In order to operate at increased depths, the suspension and control cables must be kept to a minimum size; otherwise, the cable weight becomes a problem, and, if the command craft is towing the underwater craft or, if the underwater craft is exposed to significant currents, cable drag becomes a prohibiting factor as depth increases.

It is accordingly an object of this invention to provide a cable suspended general purpose underwater manipulating system capable of being towed and capable of maneuvering without towing.

Another object of this invention is to provide apparatus that approaches human dexterity in manipulation while underwater and in many instances surpassing human capabilities underwater.

Another object of this invention is to provide a control system that provides communication to and from the underwater craft with a balance between the number of communication channels and the complexity of the electronic circuitry.

A further object of this invention is to provide an underwater craft that can attach itself to underwater objects and also maneuver without requiring forward motion of the craft to perform operations on objects where attachment to the underwater object is impractical.

A still further object of this invention is to provide an apparatus that requires a minimum amount of sealing from the pressure and corrosive effects of sea water.

Another object of this invention is to provide a manipulating arm so proportioned as to maximize the volume in which it can approach objects from several angles.

A further object of this invention is to provide means for moving the manipulatory elements that substantially maintain the elements in selected or set positions without the use of complicated feed-back or servomechanisms.

A further object of this invention is to provide a system capable of using tools; sufficient versatility in the manipulating arm, and capacity in the command system to permit the efficient use of tools are provided without excessive weight or complexity.

A still further object of this invention is to provide, in part, a modular arrangement whereby modules may be quickly replaced or modules having varied functions may be substituted.

Still another object of this invention is to provide a propulsion means with particular attention to form, mounting, and location so as to be ideally suited for a cable suspended craft and especially useful for the varied functions the craft is intended to perform.

Still another object of this invention is to provide an apparatus having holding and support means for attaching to and stabilizing on a work piece or work area for operation either in a horizontal or vertical position.

Another object of this invention is to provide a source of power that supplies energy to various elements at different energy levels providing for both fast-slow speed and high-low power operations.

Still other objects and advantages of the invention are apparent from the following specification, the drawings, and the claims herein set forth.

In the drawings:

FIG. 7 is a plan view of the arm for the underwater craft;

FIG. 8 is a sectional view of the arm taken along the line 8—8 of FIG. 7;

FIG. 8a is an enlarged portion of FIG. 8.

FIG. 16 is a block diagram showing the relationship of various command system components.

Figure 1:
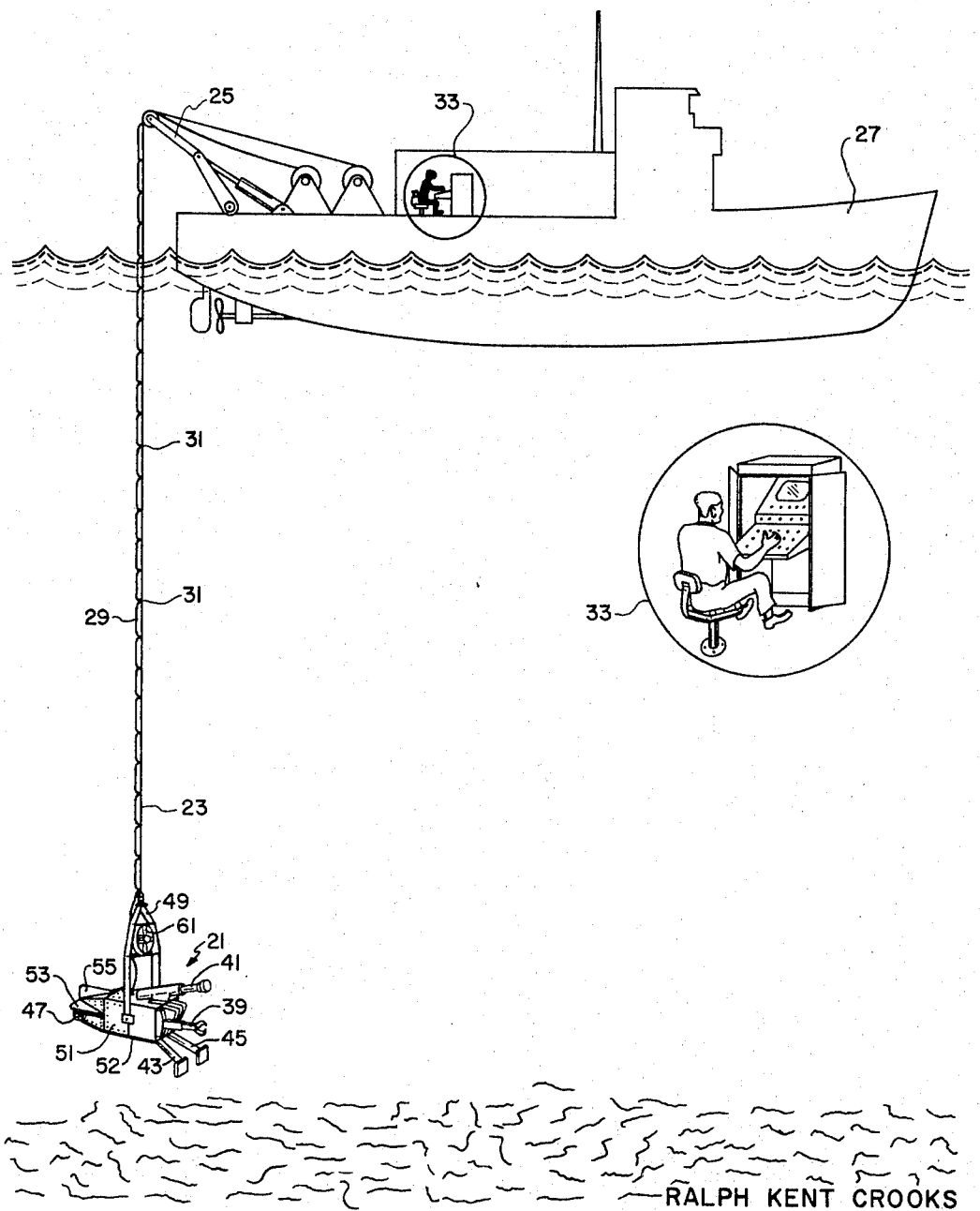
FIG. 1 is a perspective view showing the general relationship of the underwater craft and command station.
Figure 2:
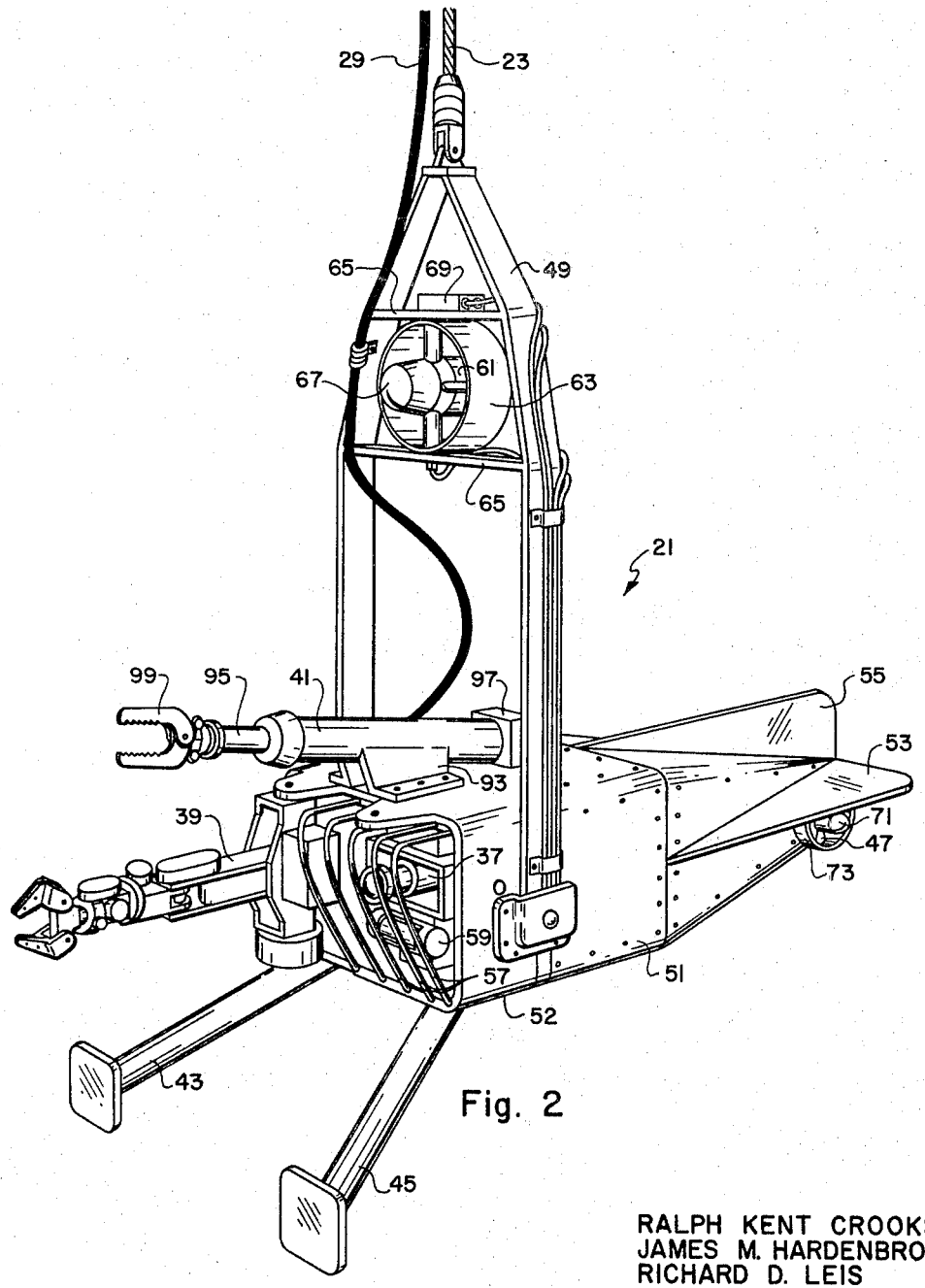
FIG. 2 is a perspective view of the underwater craft.

Referring to FIGS. 1 and 2, the general purpose underwater manipulating system 21 (hereinafter referred to as "GEPUD" 21, meaning general purpose underwater manipulating device), is suspended by a support cable 23 from suitable overboarding gear 25 positioned preferably on the above water craft 27. A control cable 29, attached to the support cable 23 by a plurality of clips 31—31, maintains communication between the GEPUD 21 and an operator-attended command station 33 (enlarged in the insert).

Figure 3:
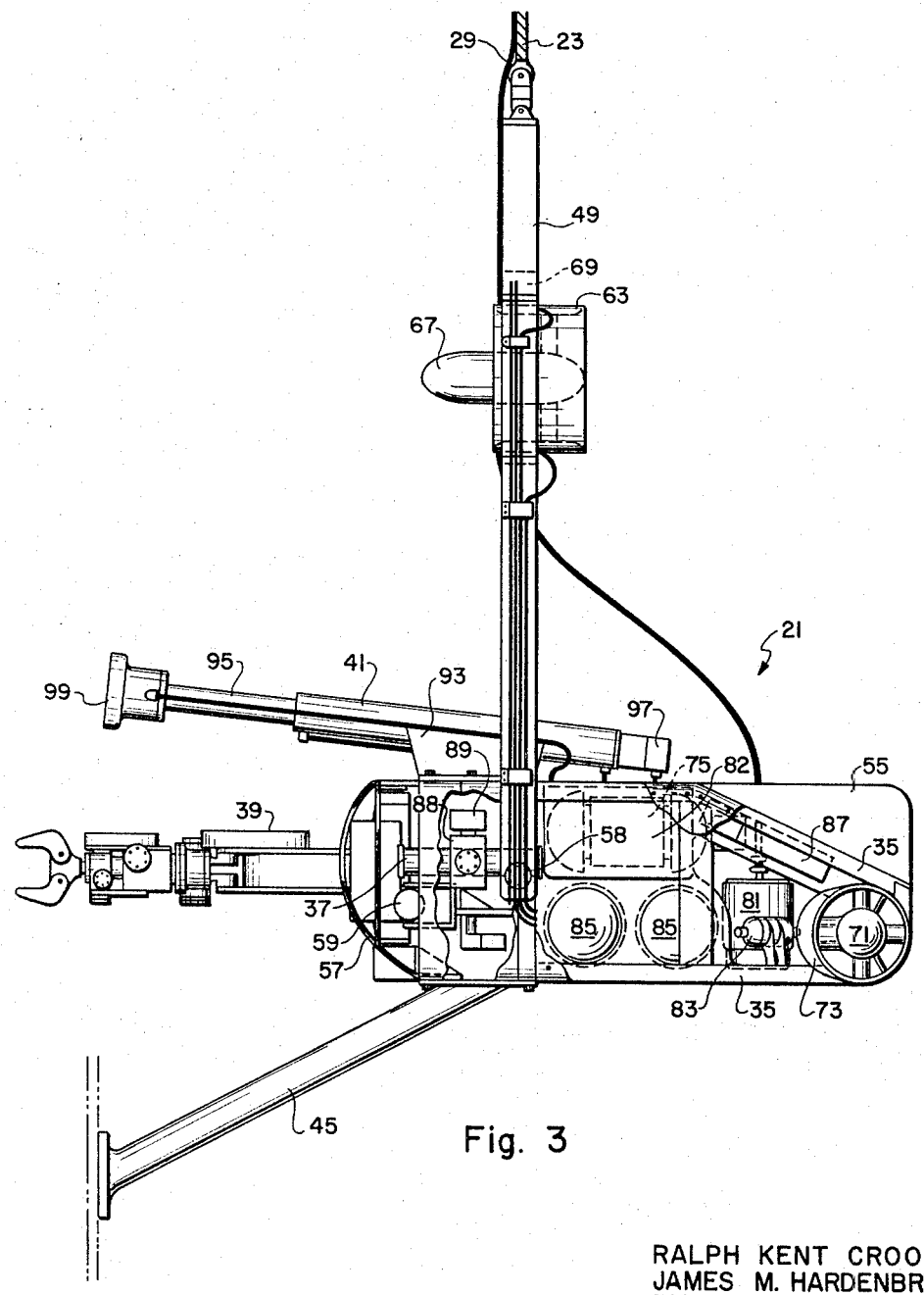
FIG. 3 is an elevational view of the underwater craft with a portion of the outer skin removed.
Figure 4:
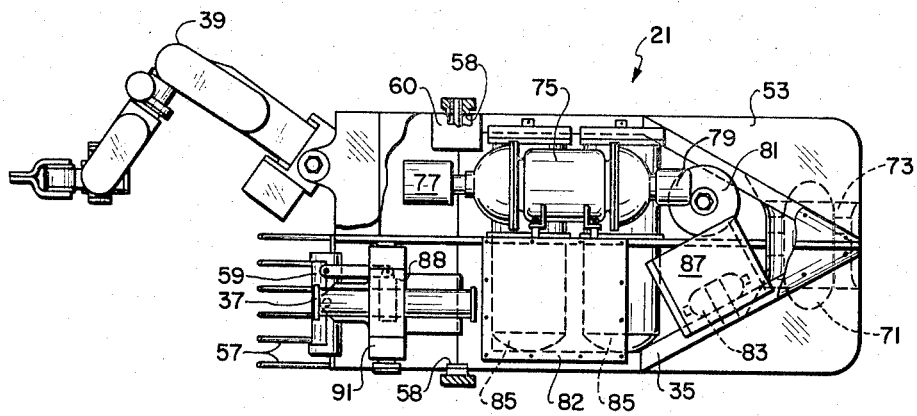
FIG. 4 is a plan view of the underwater craft with a portion of the outer skin removed.

FIGS. 2, 3, and 4 show the general structure of the GEPUD 21 and the equipment that will preferably be most frequently used. The GEPUD 21 is constructed so that various tools or elements can be plugged into mounting positions to provide over-all versatility in selection of equipment for various work problems and with a view to accepting new types of tools as future development in the art continues. A structural frame 35 serves as the mounting for hull machinery (discussed subsequently), TV camera 37, manipulating arm 39, clamp arm 41, support feet 43 and 45, propeller 47, and lifting yoke 49. The frame 35 is preferably of welded construction and consists mainly of commercially available wrought sections. The frame 35 is an open space frame to the maximum extent possible to allow access to the components for assembly, inspection and repair. A skin 51, preferably aluminum, is attached to the frame 35 and serves to protect various machinery components and to provide a hydrodynamic shape for the GEPUD 21. Preferably the skin 51 is attached with fasteners that allow for rapid removal of various sections. The skin 51 is not highly stressed since it doesn't carry the structural loads of any machinery and does not serve as a pressure boundary since the inside of the GEPUD 21 is open to sea water. Although the hull 52 of the GEPUD 21 may have a variety of shapes, the embodiment shown herein is generally rectangular in cross section. The aft section is generally tapered, slanting on three sides, toward the propeller 47. This particular arrangement gives a partial streamline allowing elements necessary for manipulation to occupy the forward end and provides space for a full horizontal fin 53 and a partial vertical fin 55. A guard 57 has been positioned over the TV camera 37 to protect it and a light 59 from damage.

The yoke 49 is pivotally attached to each side of the hull 52 at points 58—58 coinciding approximately with the center of gravity. A hydraulic motor 60 attached between the GEPUD frame 35 and the yoke 49 operates to pivot the hull 52 with respect to the yoke 49. The "front" of the GEPUD hull 52 elevates about 35 degrees with respect to the yoke 49 (to give ideal towing positions) or is depressed through a ninety degree arc with respect to the yoke 49 (in order to extend the working range to a point directly below the cable 23 or on horizontal surfaces).

The main propeller 61 is mounted on the yoke 49 having the point of thrust application generally coincident with the cable force while still retaining control in the nose-down attitude. The propeller 61 is rotatably mounted in a cylindrical housing or duct 63 and the propeller 61 is rotatable in either direction. The housing 63 is rotatably mounted on yoke cross bars 65—65 and is rotatable through 180 degrees so that the direction of thrust can be exerted through 360 degrees. The propeller duct 63 increases thrust for a given motor horsepower and protects the propeller from damage. The propeller 61 is rotated by a hydraulic motor 67 and the duct 63 is oriented by a steering actuator 69 (preferably a hydraulic motor).

An azimuth propeller 47, mounted at the "tail," controls the direction of the hull 52. It is also rotated by a hydraulic motor 71 and rotatably mounted, perpendicular to the longitudinal center line of the hull 52, in a cylindrical housing or duct 73. The housing 73 is rigidly mounted and the rotational direction of propeller 47 is reversible to produce thrust in both directions.

The location of the main propeller 61 is important for controlling various movements of the GEPUD 21. When the main drive is located in the tail section, significant turning moments are developed that are often undesirable. Also, the horizontal and azimuth position would be controlled by only one propeller. Thus, with a tail-mounted steerable propeller it is difficult to control heading and position in the horizontal plane, especially when the support cable is not hanging vertical. The vehicle tends to rotate and change position as the operator tries to maneuver to a desired position. In the preferred propeller 61 location, as shown in the drawings, the GEPUD 21 can "crab" or move sideways, resist lateral currents, and position itself without rotation. The azimuth propeller 47 reintroduces any advantages of a main rear drive by supplying rotation about the cable (or stability with respect to the cable) when desired without any of the uncontrollable disadvantages. Both propellers 47 and 61 can be cycled on and off rapidly for "jogging" the GEPUD 21 into desired positions.

The basic hydraulic system for the GEPUD 21 is made up of a power source such as an electric motor 75, a high power pump 77 and a low power pump 79. The electric motor 75 is attached to the frame and the pumps 77 and 79 are directly mounted to the motor 75. The hydraulic system provides circuits and actuators for the TV camera 37 (pan and tilt), manipulating arm 39, clamping mechanism 41, yoke positioning and propellers 47 and 61 (rotation and also positioning of main propeller 61). Preferably the frame of the motor 75 is in direct contact with sea water while hydraulic fluid is circulated through the motor 75. Both sea water and hydraulic fluid cool the motor 75 and thus aid in reducing its size and weight.

A pressure compensator 81, also a part of the hydraulic system is attached to the frame 35 near the tail. On the opposite side an accumulator 83 for the low power hydraulic circuit is attached to the frame 35. The pressure compensator 81 is used to maintain the low side or minimum pressure of the hydraulic system at a value approximately ten p.s.i. higher than the surrounding sea water pressure. This protects against sea water leakage into the electric motor 75 and the various actuators used to activate mechanisms of the GEPUD 21. Also, the pressure compensator 81 provides the pressure compensation for allowing the use of low strength vessels to house parts associated with the hydraulic system, for the pump suction ports, and is a means for accommodating hydraulic fluid volume variations due to temperature change, absolute pressure change, and movement of the actuators. A hydraulic control chamber 82 is attached to the frame 35 on the side opposite the electric motor 75. The chamber 82 contains a plurality of directional control and adjustment valves for the hydraulic system, an accumulator for the high power hydraulic circuit, and a common sump for both pumps 77 and 79.

Two electrical equipment chambers 85—85 are positioned centrally on the frame 35. These chambers 85—85 are watertight and constructed to withstand the sea water pressure. The majority of the below surface command system components are located within and protected by the equipment chambers 85—85. An electrical junction box 87 is provided and attached to frame 35 near the tail of the GEPUD 21. The junction box 87 serves as the electrical link between the electrical cable 29 and the electrical components of the GEPUD 21.

The TV camera 37 and the light 59 are preferably mounted together and pivot from side to side (pan) on a camera frame 88. The camera frame 88 is pivotally supported for up and down (tilt) movement by the GEPUD frame 35. A pan actuator 89 is provided on the camera frame 88 and a tilt actuator 91 is provided on the frame 35. The light 59 is preferably a mercury lamp that is cooled by ambient water and intended to be operated only under water.

The clamping device 41 is preferably located on top of the GEPUD hull 52 thus giving the widest possible span between it and the support feet 43–45. The clamping device 41 includes a base 93 that is attached to and transmits its forces to the frame 35. Ordinarily the arm 41 operates on a fixed longitudinal axis having an extendable portion 95. A hydraulic motor 97 is provided to rotate the portion 95. An attaching device 99 is positioned at the end of the extendable portion 95 and may take the form of a claw (FIG. 2), suction cup (FIG. 3), or other more specialized device depending upon the application requirements.

The clamp arm 41, above the arm work area, and the support feet 43 and 45, below the arm work area, provide a means for stabilizing the vehicle while working with the hull 52 in either a horizontal or vertical position. When in the horizontal position, a fixture 99 (such as a clamp) "hangs on" while the feet 43 and 45 support. The cable 23 is slackened and all or a portion of the submerged weight of the GEPUD 21 stabilizes the vehicle and enables it to induce forces of sufficient magnitude in the work piece. A free swimming submersible has force reaction problems that are similar to the weightless condition of an astronaut in orbit. In the vertical position, the hull 52, the clamp arm 41 and the support feet 43 and 45 act like a tripod. Again, all or a portion of the GEPUD weight provides stabilization.

The GEPUD 21 is a general purpose device and the components are constructed for maximum flexibility. The arm 39 is designed as a module and is removable as a unit for replacement by another unit or module such as sonar, a film-type camera, or other specialized devices for accomplishing varied tasks or collecting data. The arm 39 is preferably hydraulically activated by the low power hydraulic circuit and electrically controlled by multiple conductor cable. The hydraulic and electrical connections are usable with other modules that are substituted for the arm 39. Both hydraulic and electrical connections are of the quick-disconnect type to facilitate change of modules and prevent loss of hydraulic fluid. The "shoulder" of the arm 39 is constructed so that two individual arms 39—39 can be used on the GEPUD 21 by just pointing both "elbow joints" outward.

Figure 5:
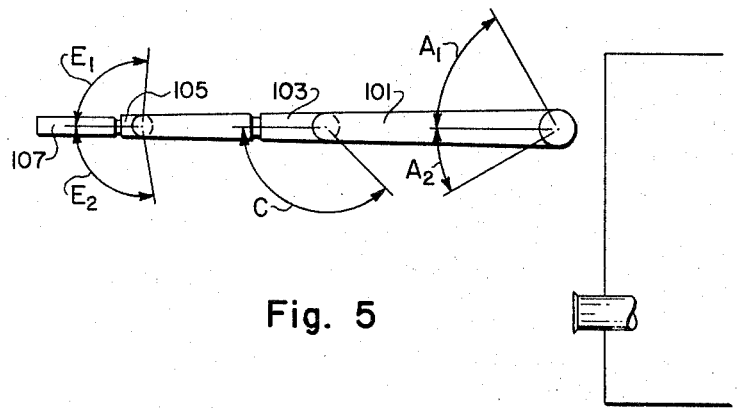
FIG. 5 is a plan view diagram of the arm showing the elements and their preferred movement freedoms.
Figure 6:
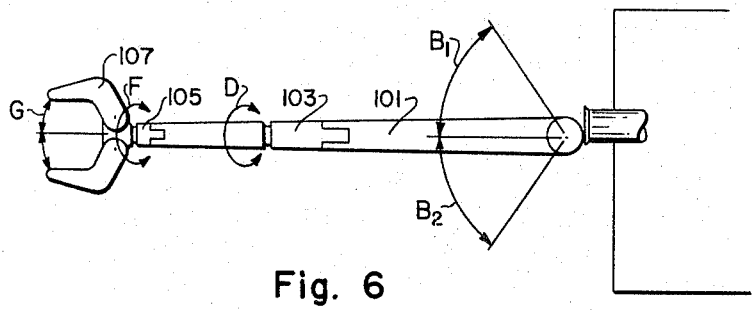
FIG. 6 is a side view diagram of FIG. 5.

FIGS. 5 and 6 show the basic elements of the arm 39, the various rotational and pivotal points, and the preferred movements of the various elements. The preferred arm construction includes an upper arm 101, forearm 103, wrist 105, and hand or clamp 107. The arrows $A_1$, $A_2$, $B_1$, $B_2$, C, D, $E_1$, $E_2$, F, and G indicate the various movements that have been selected for embodiment of the arm shown in FIGS. 7–10. There are six degrees of freedom plus hand clamping. The useful working space for the arm 39 should be centered in front of the hull 52 so that the light 59 illuminates, and the camera 37 is capable of viewing, the hand 107 in substantially all possible positions. Some of the important functions for the arm 39 and those considered basically necessary are: (a) ability to position the hand 107 to selected points in some working volume; (b) ability to selectively control the orientation of the hand 107 at these points; and (c) ability to control the orientation of the hand 107 as it translates from point to point, these points being either in a straight line along an axis or in a plane parallel to the work surface. These movements are associated with various tasks to be accomplished underwater of which the following are examples: (1) drilling operations; (2) cutting torch or welding operations; (3) engaging hooks, eyes, pins in devices, etc.; (4) picking up or positioning objects; (5) sawing operations; (6) operating a jack crank, opening a door or hatch, etc.; (7) swinging a small pick or hammer; and (8) digging operations.

The preferred construction of the GEPUD arm 39 is shown in FIGS. 7–10. Referring to FIGS. 7 and 8, the socket for the arm 39 is fitted into the frame 35. A control enclosure 108 houses a valve manifold 124 and hydraulic directional control valves 126—126. The manifold 124 receives hydraulic fluid from the low power hydraulic circuit (FIG. 11) through port 128 and the hydraulic fluid is returned to the sump 82 through port 130. A plurality of hydraulic fluid hose connection sockets, arranged in pairs, 109–116, 110–117, 111–118, 112–119, 113–120, 114–121, and 115–122 connect electrically activated hydraulic directional central valves 126—126 with appropriate actuators in the arm 39. In conjunction with the control valves 126—126 each hose connection 109 through 115 provides hydraulic pressure for moving a connected joint actuator in one direction and each corresponding paired hose connection 116 through 122 provides hydraulic pressure for movement of the connected joint actuator in the opposite direction. A conduit 123 carries hydraulic fluid to each hose connection 109 through 122 and a needle valve 125 is positioned to control the flow through each conduit 123. The needle valves 125—125 are adjustable to balance the joint movements and provide smooth operation of the arm 39. Replacement of, or substitution for, arm modules involves only the attachments to the frame 35, connections to ports 128 and 130 and the electrical connections.

The movements of the arm 39 referred to herein are, for convenience, designated as horizontal, vertical, or rotational (as if the longitudinal axis of the GEPUD hull 52 were horizontal). It should be noted, however, that in operation, the longitudinal axis of the GEPUD hull 52 can be oriented in a plurality of positions.

Two connected vertical plates 127—127 having two end pins 129 and 131 are rotatably mounted to the frame 35. Pin 129 is mounted in a bushing 133 and pin 131 is connected to a hydraulic actuator 135. The upper arm 101 is pivotally mounted to the center of plates 127—127 by means of a pin 137 rotatable in bushing 139 and a hollow pin 141 rotatable in bushing 140 and connected to a hydraulic actuator 143 through shaft 144 by means of a key 142. The hydraulic actuators 135 and 143 are preferably of a rack-on-a-piston type shown in cross section in FIG. 9. Hydraulic actuator 135 provides horizontal shoulder movement designated $A_1$ and $A_2$ in FIG. 5 while hydraulic actuator 143 provides vertical shoulder movement designated $B_1$ and $B_2$ in FIG. 6. In the arm intended for actual use on the GEPUD 21, $A_1$ is selected as 60 degrees, $A_2$ is selected as 30 degrees, $B_1$ is selected as 55 degrees, and $B_2$ is selected as 55 degrees. The shoulder in the example arm has a movement of 90 degrees arc horizontal and 110 degrees arc vertical.

The forearm 103 is pivotally mounted on the upper arm 101 by means of pins 145 and 147 mounted in bushings 149 and 151, respectively. Pin 145 is provided with a double sprocket wheel 153 that is connected by means of chains 155—155 to a double sprocket wheel 157. A cover plate 159 is provided over the sprocket wheels 153–157 and chains 155—155. The space between the cover plate 159 and upper arm 101 is filled with hydraulic oil (which is connected to the hydraulic sump through manifold 124). The sprocket wheel 157 is connected to a hydraulic actuator 161 by means of an axle or pin 163. The hydraulic actuator 161 provides horizontal forearm movement through the arc designated C in FIG. 5. In the example arm this arc was selected as 135 degrees to the left of the longitudinal axis.

Figure 9:
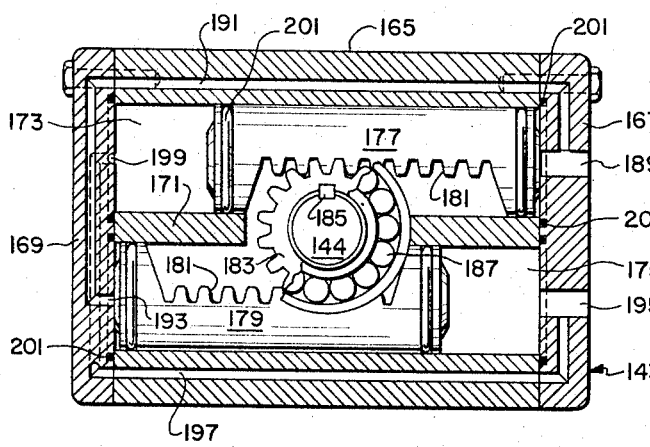
FIG. 9 is a sectional view of a portion of the arm taken along the line 9—9 of FIG. 8 and showing one type of actuator for moving an element of the arm.

FIG. 9 is a cross-sectional view of hydraulic actuator 143 and is also the type of actuator selected for hydraulic actuator 135. The actuator 143 is provided with a frame 165 having two port and transfer heads or end plates 167 and 169 and a control partition 171 that define two chambers 173 and 175. Each chamber 173 and 175 is provided with a piston 177 and 179, respectively. The pistons 177 and 179 are provided with racks 181—181 that engage a central pinion 183. The pistons 177 and 179 move in opposite directions to rotate the pinion 183. The pinion 183 is connected by suitable means such as key 185 to the shaft 144. Suitable bearings 187—187 are positioned around the pinion 183 to reduce friction. The hydraulic actuator 143 operates to rotate shaft 144 in one direction with hydraulic fluid entering port 189 and passing through duct 191 to port 193. Hydraulic fluid may also enter port 195 and pass through duct 197 to port 199 rotating shaft 144 in the opposite direction. Various seals, such as O-rings 201—201 are provided to prevent oil leakage.

The hydraulic oil hoses (not shown), connected between the hose connection sockets 109 through 122 and the actuator ports (such as ports 185 and 195), are passed through the central portion of the arm 39 rather than dangling loosely over the outer surface of the arm 37. Hollow spaces, such as connecting chambers 203 (of the upper arm 101) and 205 (of the forearm 103) are provided for this purpose.

The forearm 103 is divided into a lower forearm section 207 and an upper forearm section 209, the lower forearm 207 being rotatable with respect to the upper forearm 209. The lower forearm has an extension or shaft rotatably mounted in bearings 213 that are positioned between the shaft 211 and upper forearm 209. The rotational movement is provided by a hydraulically actuated gear motor 215 that has a worm gear 217 engaging a driven gear 219 that is attached to shaft 211. The hydraulic motor 215 provides the movement designated D in FIG. 6. The rotation of the example arm was selected as 90 degrees in either direction or through an over-all arc of 180 degrees.

The wrist 105 is pivotally mounted at the end of the forearm 103 and is free to swing through the arcs designated $E_1$ and $E_2$ in FIG. 5. A pin 221, attached to the wrist 105, rotates within bushing 223. Bushing 223 is attached to forearm 103. A second pin 225 (shown enlarged in FIG. 8a) is attached to wrist 105 and rotatably mounted in forearm 103 by means of bearings 226—226. A plurality of annular grooves 227—227 are positioned in the wrist 105, around the pin 225 and between the mating surfaces of forearm 103 and 105. A plurality of O-rings 229—229 are positioned, one on each side of each annular groove 227, around the pin 225 also between the mating surfaces of forearm 103 and wrist 105. This construction provides a rotating seal for hydraulic fluid that is supplied to the wrist 105. For example, hydraulic fluid is supplied to a hose connection 231 (FIG. 8) and passes through a duct 233 to one of the annular grooves 227. From the annular groove 227 the hydraulic fluid is supplied to a chamber 235 (for opening the "hand") by means of the connecting duct 237. Similarly, ducts 234—234 supply hydraulic fluid to annular rings 227—227 and then to the connecting ducts 236—236. Each duct 234 has a hose connection (not shown) comparable to connection 231. One of the connecting ducts 236—236 supplies hydraulic fluid for closing the hand, two of the ducts 236—236 supply fluid for hydraulic motor 253 (for hand rotation) and one of the ducts 236—236 serves as connection back to the manifold 124 to the sump.

The pin 221 is attached to a sprocket wheel 239 which is connected by a chain 241 to a sprocket wheel 243. The sprocket wheel 243 is connected to a pin 245 having a driven gear 247 engaged by a worm gear 249 of hydraulic motor 251. Hydraulic motor 251 is responsible for the horizontal movements of the wrist designated $E_1$ and $E_2$ in FIG. 5. In the example arm the arc $E_1$ is selected to be 95 degrees and the arc $E_2$ is selected to be 100 degrees. These movements are, of course, not horizontal if the lower forearm section has been rotated.

The wrist movement designated as F in FIG. 6 is selected as a continuous rotational movement in either direction allowing the hand to operate as a screw driver, wrench, drill and the like. Hydraulic motor 253, positioned on the upper section 255 of wrist 105, has a worm gear 257 that drives a gear 259. Gear 259 is attached to the lower section 261 of wrist 105. The lower wrist section 261 is rotatably supported within the upper wrist section 255 by means of bearing units 263, 264, and 265.

Figure 10:
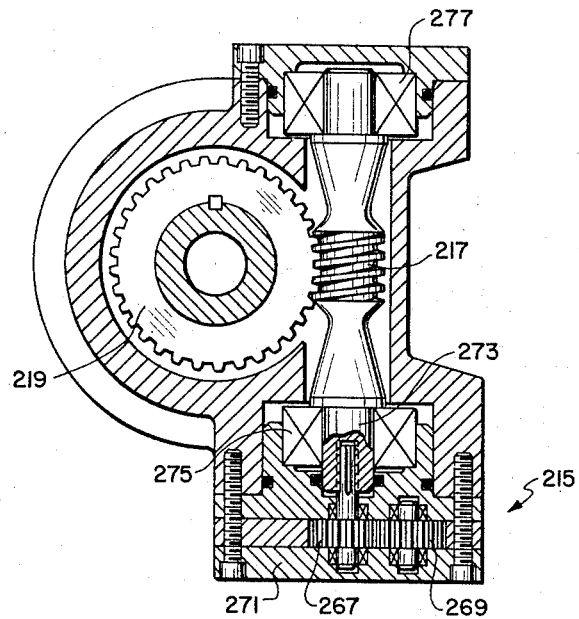
FIG. 10 is a sectional view of another type of actuator taken along the line 10—10 of FIG. 7.

FIG. 10 is a sectional view through hydraulic motor 215 and is also the type of actuator selected for hydraulic motors 251 and 253. Two gears 267 and 269 enclosed in a housing 271 are driven in either direction by hydraulic fluid from two separate hose connections (one of the pair of the paired hose connections 109–122). The gear 267 is connected to a shaft 273 that is rotatably supported by bearings 275 and 277. Rotation of shaft 273 rotates the attached worm gear 217 which, in turn, drives gear 219.

External forces on the elements of the arm 39 (upper arm 101, forearm 103, wrist 105, and hand 107) are ordinarily resisted by the hydraulic actuators 135, 143, 161, 215, 251, and 253 since the driven gears will not drive or move the worm gears because of locking due to friction and pinion 183 will not move pistons 177 and 179 while chambers 173 and 175 are sealed off.

The clamping and opening action of the hand 107, designated as G in FIG. 6, is provided by hydraulic pressure supplied to chamber 235 and acting on either side of piston 279. Chamber 235 is a double acting cylinder that is supplied hydraulic fluid from one of the pair of paired hose connections 109–122 (and as previously mentioned through connecting duct 237 and one of the connecting ducts 236—236). The piston 279 is connected to a rack 281 by means of shaft 283. Clamp jaws 285—285 are keyed to rotatable shafts 287—287 on outer wrist section 261. The clamps are provided with pinions 289—289 so that reciprocal movement of the rack 281 opens and closes the clamp jaws 285—285.

Figure 11:
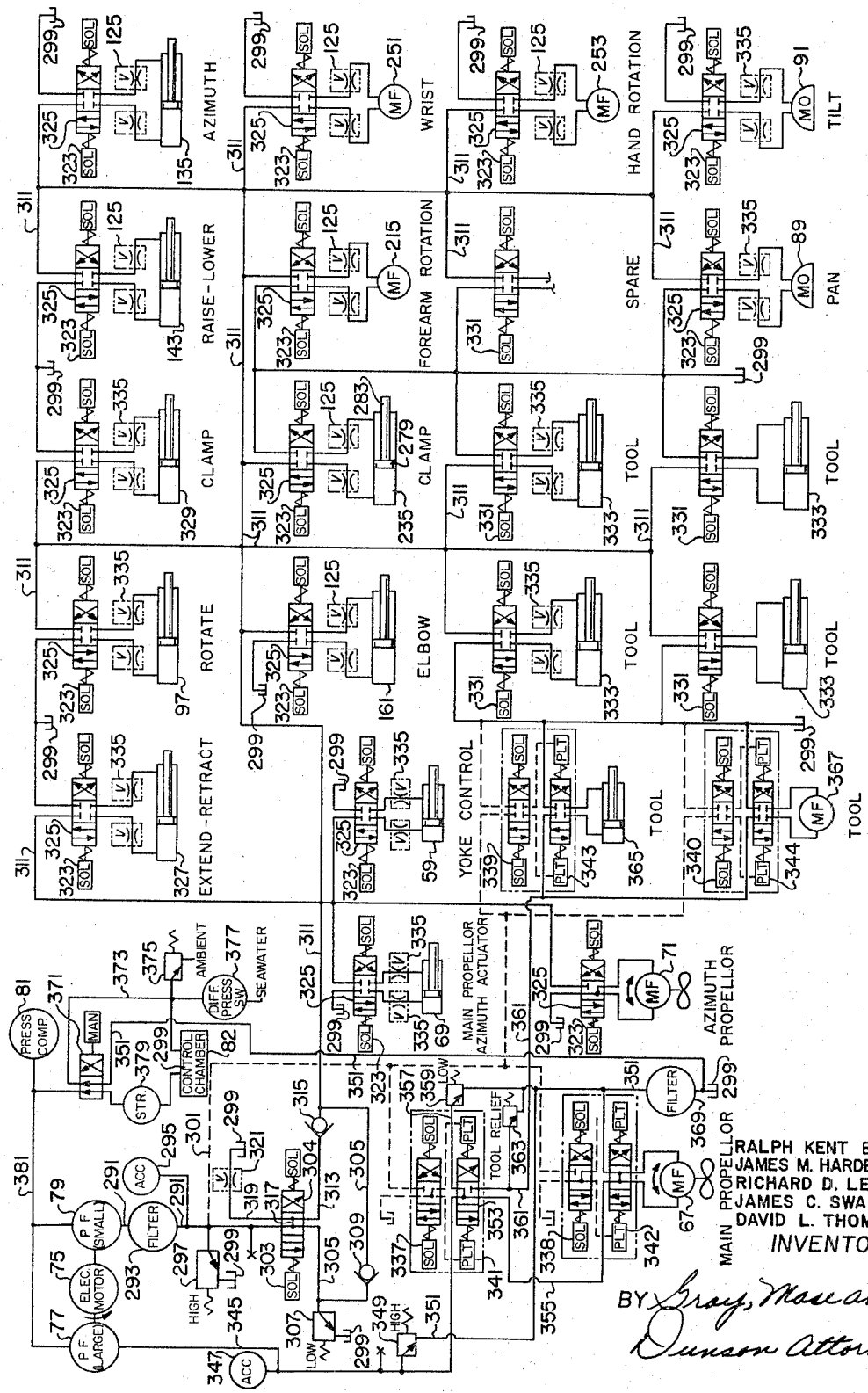
FIG. 11 is a diagram of the hydraulic circuit of the underwater craft.

The hydraulic system for supplying hydraulic fluid pressure to arm 39, and various other hydraulically actuated components, is shown in the diagram of FIG. 11. In the diagram the electric motor 75 provides rotative power for a high power pump 77 and a low power pump 79. The elements receiving fluid for operation from the low power system are controlled by a plurality of solenoid operated directional valves. Other solenoid valves, using the low power fluid, pilot operate large directional control valves in the high power system.

The outlet line 291 is preferably provided with a filter 293 to protect small solenoid valves, etc., from any contamination. The outlet line 291 continues from the filter 293 and supplies an accumulator 295 which reduces pressure pulsations and provides instantaneous flow in excess of pump displacement. A relief valve 297 is connected between the outlet line 291 and the return line or sump 299. The relief valve adjusts the maximum pressure of the low power system, which for the particular embodiment discussed herein is selected as 1800 p.s.i. The pressure of the low energy system is supplied through control line 301 (shown as a dashed line in FIG. 11) to a plurality of solenoid valves that in turn control a plurality of pilot valves for the high energy system.

The hydraulic control valves for the low power hydraulic circuit are preferably three-position solenoid-actuated spool valves. Outlet line 291 continues to the first solenoid valve 303. When the solenoid valve 303 is activated with the spool 304 shifted to the right (right according to the orientation in the diagram), outlet line 291 is connected to low pressure line 305 which contains a pressure relief valve 307 and a check valve 309. Low pressure line 305 continues and connects into main supply line 311. The pressure relief valve 307 is connected to the sump 299 and reduces the pressure to a selected value between about 200 and 1000 p.s.i. When the spool 304 is in the right-shifted position, the hydraulic actuators supplied by the low power system move at a reduced rate of speed and with less power.

When spool 304 is left-shifted, outlet line 291 is connected to high pressure line 313 which contains a check valve 315 and also connects to main supply line 311. The left-shifted position of solenoid valve 303 supplies high pressure to various hydraulic actuators connected into the low power system providing the actuator with increased speed and power. Solenoid valve 303 also has a useful unactivated position, the position shown in FIG. 11. In the unactivated position, outlet line 291 is connected to both low pressure line 305 and high pressure line 313 through a cross passage 317 in spool 304. Outlet line 291 is also connected to a return line 319 which leads to the sump 299. Line 319 contains a restrictive needle valve 321 that is adjusted to keep a slight bias on the entire low power system to ensure a hydraulic fluid pressure is always present for operating pilot valves in the high energy system.

Once the hydraulic fluid has been passed into the main line 311 it is available for a plurality of hydraulic motors. The hydraulic motors are controlled by three-position solenoid valves 323—323 each having a spool 325 with a central or unactivated off position. The left-shifted position of each spool 325 moves the connected hydraulic actuator in one direction by applying pressure from the main supply line 311 to one side of the actuator while connecting the other side to the sump 299. The right-shifted position of each spool 325 reverses the pressure applications so that the connected hydraulic actuator moves in the opposite direction. The hydraulic actuators that are preferably connected to the low pressure system are as follows: a piston-type actuator 327 for extending and retracting the clamp arm 41; the hydraulic actuator 97 of the piston-rack pinion type for rotating the clamping device 41; the piston-type actuator 329 for operating the attaching device 99 when a clamping device is used (or a rotary motor-type actuator for driving a sea water pump for producing suction when a suction cup is used); the piston-rack pinion-type actuator 143 for raising and lowering the upper arm 101; the actuator 135 for moving the arm horizontally; actuator 69 for positioning the main propeller; actuator 60 for controlling the yoke; actuator 161 for bending the arm 39 horizontally at the elbow; the actuator (double acting cylinder 325) for the hand or clamp 107; actuator 215 for rotating the forearm 103; actuator 251 for moving the wrist 105 horizontally; actuator 253 for moving the outer wrist portion 261; actuator 71 for rotating the azimuth propeller 47; actuator 89 for controlling the pan of the TV camera 37; and actuator 91 for controlling the tilt of the TV camera 37. The main line 311 is also connected to a plurality of solenoid valves 331—331; each solenoid valve 331 controls a hydraulic actuator 333 intended for various extra tools that may be required by the gepud 21 for special underwater operations. Examples of such extra tools are specialized drills, reels, percussion tools, etc., that are held by or operate independently of the arm 39. Flow control valves, such as needle valves 125 and 335 are used as required to adjust the flow to the various hydraulic actuators. Needle valves 125—125, as previously mentioned are located in the arm module control box (FIG. 8) of the arm 39 while the needle valves 335 are preferably positioned in the hydraulic chamber 82.

The control line 301 supplies hydraulic fluid to solenoid valves 337, 338, 339, and 340 which in turn control pilot operated valves 341, 342, 343, and 344, respectively.

The high power pump 77 supplies hydraulic fluid to an outlet line 345 that is provided with an accumulator 347 and a high pressure relief valve 349 connected to a return line 351. The relief valve 349 is preferably set for a maximum pressure of about 2500 p.s.i. Outlet line 345 is connected to pilot operated valve 341 having a spool 353. The unactuated position of spool 353 connects line 345 to main propeller line 355 and low pressure line 357. The low pressure line 357 is connected through an adjustable pressure relief valve 359 to the return line 351. The relief valve 359 is adjusted to provide a pressure below 2500 p.s.i. and consequently low power through the pilot operated valve 342 to the hydraulic motor 67 of the main propeller 61. When the spool 353 of valve 341 is right shifted, outlet line 345 is connected to main propeller line 355 and the low pressure line 357 is disconnected so that high pressure hydraulic fluid is provided to actuate propeller motor 67. The left-shifted position of spool 353 disconnects the main propeller line 355 and connects outlet line 345 to tool line 361. Tool line 361 includes an adjustable pressure relief valve 363 connected to return line 351. The tool line 361 provides hydraulic fluid through pilot operated valves 343 and 344 to the hydraulic motors 365 and 367 that are available as a power source for high capacity tools (not shown). The main propeller 61 and motors 365 and 367 would not operate simultaneously.

The return line 351 passes through a filter 369 and to a manual valve 371, which, in normal position, connects return line 351 to a sump line 373. The sump line 373 includes a relief valve 375, a differential pressure switch 377, and connects to the sump 299 in control chamber 82. The relief valve 375 is an overboard dump used as an overload precaution. For example in a case where the hydraulic system is charged with fluid in a cool climate and shipped through the tropics on the deck of a ship, the increase in temperature could cause such an expansion of the hydraulic fluid that the system would be overloaded. The differential pressure switch 377 senses a minimum pressure differential between the seawater and lowest pressure of the hydraulic system. When the minimum hydraulic fluid pressure approaches seawater pressure, the operator at the command station receives a warning signal from the pressure switch. The fluid passes from the sump 299 through a strainer 379, the manual valve 371, to an intake line 381 (line 381 taps into the pressure compensator 81) connected to both of the pumps 77 and 79. The manual valve 371 is available to connect return line 351 directly to intake line 381 by-passing the sump 299, differential pressure switch 377 and relief valve 375. With the sump 299 disconnected, the control box 822 can be opened and various adjustments made on the system such as adjustment of needle valves 335.

The valve approach, "on-off" as opposed to position feedback servo valve control is preferred for two reasons. It is more economical and less complex; also, it does not require proportional or analog voltage signal transmission between the ship and gepud. The rack and pinion-type actuator with the pistons in cylindrical bores and O-ring seals keeps leakage at practicaly zero; consequently, the drift of the elements that these motors operate is practically zero. The worm-gear actuators, used in the arm 39 have a high helix angle that locks them in whatever position they are moved to by the gear motors.

Figure 12A:
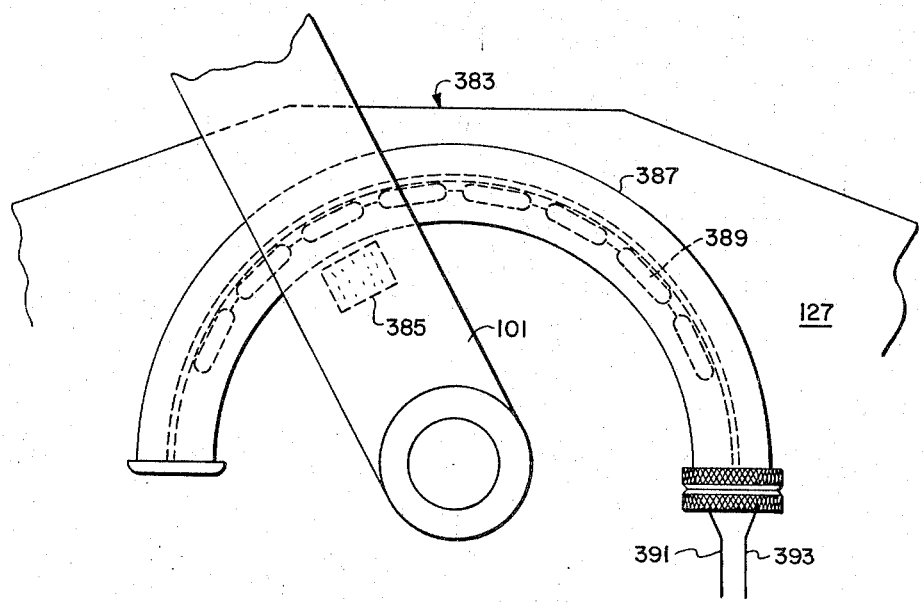
FIGS. 12a and 12b are diagrams of a position sensor for use in the underwater craft.
Figure 12B:
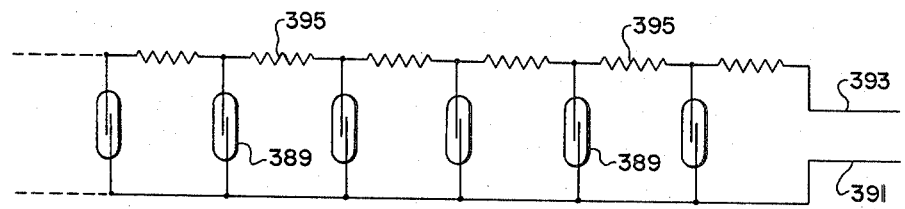

FIGS. 12 and 12b are diagrams of an embodiment of a position sensor 383 for indicating the position and relationship of various structures of the gepud 21, as, for example, the arm elements. Such a position sensor 383 is positioned at the pivot between the upper arm 101 and the plate 127. A permanent magnet 385 is attached to the upper arm 101 and moves therewith. The magnet 385, on arm movement, sweeps along a tube 387 that is mounted on the plate 127. The tube 387 contains a plurality of reed switches 389—389 that function to connect two conductors 391 and 393. A plurality of resistors 395—395 are connected between the reed switches 389—389 in such a manner that the progressive sequential closing of the reed switches 389—389 from one end of the tube 387 increases the resistance of the circuit and progressive sequential closing of the switches 389—389 in the opposite direction decreases the resistance of the circuit. Thus, the position of the upper arm 101 is determined by the circuit resistance.

The construction of an optimum command system for the gepud 21 involves the consideration of a number of conflicting factors. From a practical standpoint, the command-power cable 29 should be as light and as small in diameter as possible in order to reduce drag on the gepud 21 when swimming, and to alleviate problems encountered when reeling the cable 29. Furthermore, the cost of a small-diameter cable is less than that of a large cable. It, therefore, would appear that a command system requiring very few conductors to accomplish the desired commands would be preferable. Techniques are available which will permit the command of many functions over one wire. On the other hand, commands can be handled over a multitude of wires, each command function having its own individual command wire. In systems using these techniques, the terminal equipment for the one-wire system would very likely be quite complicated, whereas the terminal equipment for the multiwire system would be the utmost in simplicity. The command system of this invention is considered to be an optimum system falling between the one-wire (multiplex) system and the wire-per-command system. The cable 29 is of practical size while the terminal systems above water and below are not prohibitively complicated and expensive.

Another important consideration in arriving at the optimum command system concerns the formation handling rate or speed of the system. This is measured as the number of individual commands the system can handle per second without interference between command signals. In general, a system capable of handling a high information rate would be much more complicated than a slower or low-information rate system.

The required information rate of the command system for the GEPUD 21 is ultimately determined by the amount of information the GEPUD operator can handle in a given period of time, i.e., the number of commands on which he can make decisions and transmit in a period of time. The lag time between a stimulus and action is about 0.1 second to 0.2 second. Thus, if we consider the commanding of a specific function which requires a decision by the operator before each command is given, the second command follows the first by an interval of time equal to the human reaction time plus the lag in the command system. This total time interval represents the minimum time between commands and establishes the maximum number of single commands which can be handled in a given time. A human reaction time of 0.1 to 0.2 second and a time lag in the command system of 0.1 to 0.2 second gives an overall lag of 0.2 to 0.4 second. This time lag still gives an operator the "feel" that he has control of the device. However, under certain conditions the operator can handle two commands nearly simultaneously. The command system of this invention in this case accepts both commands, even though they overlap in time and transmits them with an overall delay no longer than the lag of 0.1 to 0.2 second. The commands are initiated and stored to be released sequentially as a channel becomes available. This arrangement permits a greater number of commands to be handled per second without exceeding the assumed permissible overall delay time.

Another factor is that certain underwater functions are sensed, for instance, the orientation of the TV camera (position sensor of FIGS. 12a and 12b), the attitude of the GEPUD hull 52 with respect to the yoke 49, compass heading, depth, etc. Through a special technique the same cable conductors are used for the sensory signals as are used for the command functions.

Although the numbers may be varied to fit various requirements, in the preferred embodiment thirty separate trinary commands are provided by the system each of which have a "right," "left," or "center" position choice making ninety selections possible. The selection of any one of thirty functions and the command of those functions is transmitted over six cable conductors and one common conductor.

Figure 13:
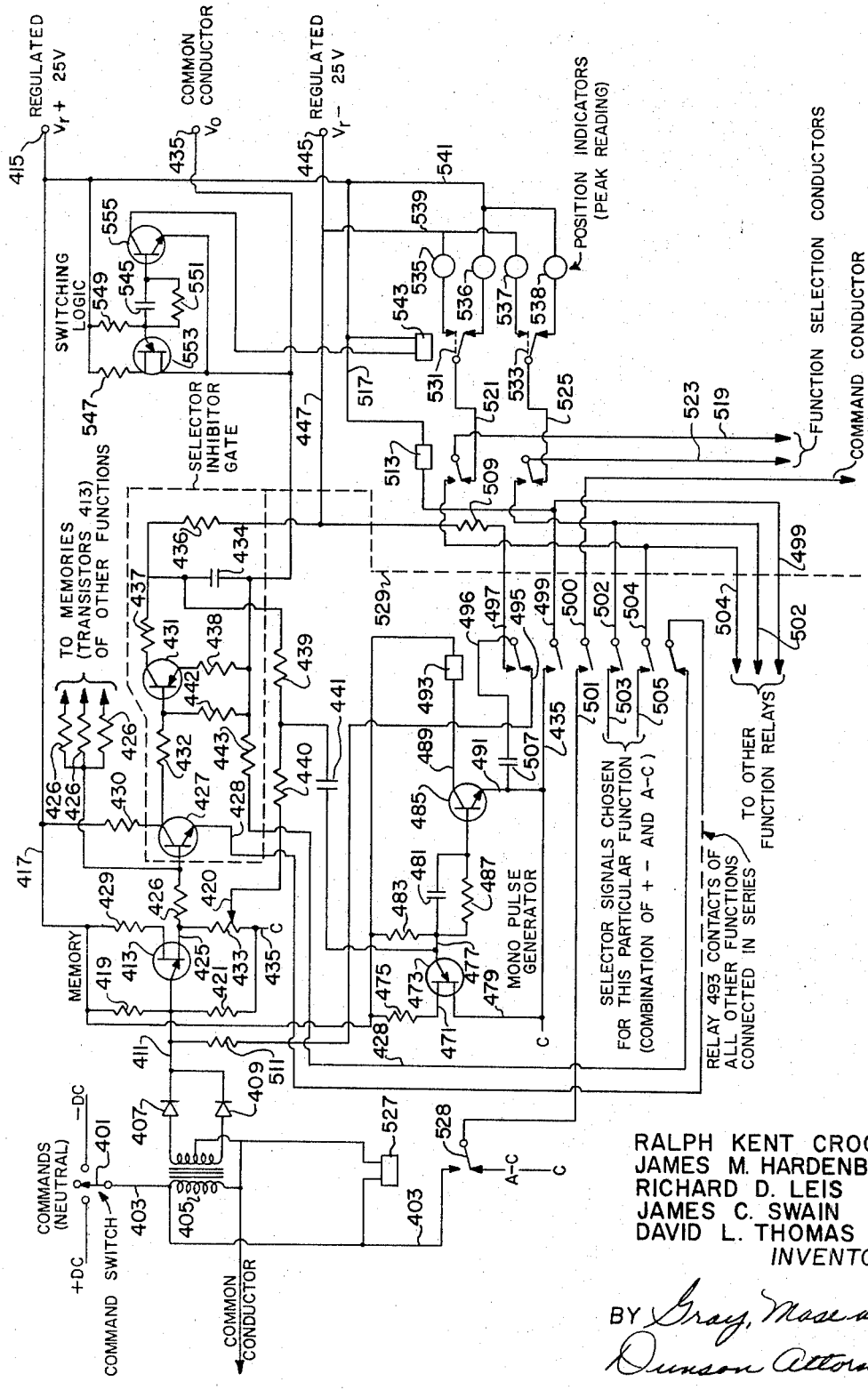
FIG. 13 is a diagram of the above water portion of the command circuit.

FIG. 13 is a schematic circuit of the above-surface portion of the GEPUD command system. The circuit shown is for a single function only.

A command system that controls the thirty functions has thirty such circuits except for the selector-inhibitor gate and portions of the switching logic circuit of which there are preferably two of each common to fifteen command channels each. A three-position toggle switch 401 is connected by a conductor 403 to the primary coil of a transformer 405. Two diodes 407 and 409 are connected to each end of the secondary coil of transformer 405 so that regardless of whether the input signal to the primary of transformer 405 is positive or negative, the output signal from the transformer 405 through diodes 407 and 409 to conductor 411 will always be positive.

The change in voltage by throwing switch 401 gives rise to a single current pulse that passes along conductor 411 to the unijunction transistor 413. The emitter of transistor 413 is biased from a regulated 25 volt source 415 through conductor 417 and resistors 419 and 421. Unijunction transistor 413 functions as a conventional flip-flop type (acting as a memory) and upon receiving a positive pulse at the emitter, the transistor 413 becomes more conductive and the potential of conductor 425 becomes more positive with respect to C (the common for the system). The transistor 413 remains conductive until a pulse of opposite polarity (negative) is applied to the emitter along conductor 411.

When transistor 413 becomes more conductive, a positive step of voltage occurs at the arm 420 of potentiometer 433 (from conductor 417, through resistor 429 and conducting transistor 413). Also, positive current flow through resistor 426 to the base of transistor 427 turns on transistor 427. A positive potential is supplied to the collector of transistor 427 from conductor 417 through resistor 430. When transistor 427 is turned on, the positive potential at the collector is reduced due to the connection through conductor 428 to common. The connection to common through conductor 428 passes through a plurality of serially connected relay contacts so that if any one of the relay contacts is opened, the effectiveness of transistor 427 being turned on is nullified. A positive bias is applied to the base of transistor 431 through resistor 432, and when transistor 427 is turned on the decrease in potential to the base of transistor 431 turns it on.

The capacitor 434 has been charged to a negative potential through conductor 447 and resistor 436 from a regulated negative source 445. Turning on capacitor 431 discharges capacitor 434 to common 435 through resistors 437 and 438. The discharge of capacitor 434 appears as a decreasing negative potential at resistor 439. The positive potential at the potentiometer arm 420 appears at the resistor 440. When the value of the negative voltage through resistor 439 is less than the value of the positive voltage through resistor 440, a positive voltage is passed to capacitor 441 and is passed on to the mono-pulse generator.

Resistors 442 and 443 are biasing resistors to set the level of operation of transistors 427 and 431.

The potential from the capacitor 441 is transmitted to the emiter of unijunction transistor 473. Transistor 473 is biased by the positive 25 volt source 415 through resistor 475. When the pulse from capacitor 441 is received, transistor 473 conducts momentarily and the emitter lead 477 is connected through conductor 479 to common 435. This allows capacitor 481 to discharge; capacitor 481 is charged from the 25 volt source 415 through resistor 483. Discharging capacitor 481 upsets the bias on transistor 485, transistor 485 being biased from the 25 volt source 415 through resistors 483 and 487, and transistor 485 then conducts between collector lead 489 and emiter lead 491. This activates relay 493 by connecting it to common 435.

Activation of relay 493 moves a plurality of contacts to disconnect conductors 495 and 496, interrupt or break conductor 428, and connects conductor 496 to 497, 435 to 499, 500 to 501, 502 to 503 and 504 to 505.

Breaking conductor 428 nullifies the effect of turning on transistor 427, that is, the bias on transistor 431 is re-established turning it off. This permits capacitor 434 to recharge and block any signal from any other of the fourteen command circuits that may have been originated simultaneously with the presently discussed command signal or shortly thereafter. Thus, transistor 427 and 431 and capacitor 434 act as a selector-inhibitor gate. The potentiometers (433) of each command circuit are adjustable. A priority of command signals is established by the potentiometer (433) with the highest adjusted positive potential firing its associated monpulse generator when the ramp negative voltage from capacitor 434 just passes a negative value that is overcome by the highest portion voltage of a potentiometer (433) from an activated memory. Note that the ramp voltage is not established until transistor 431 is turned on and transistor 431 will not be turned on while any relay 493 is activated because conductor 428 will be disconnected from common. The effect is that as long as one command circuit is in operation, capacitor 434 stays charged and blocks all the related command circuits.

Connecting conductor 496 to 497 charges capacitor 507 from a negative 25 volt source 445 through resistor 509. This charge is subsequently used to reset the memory (switch off transistor 413 via conductor 495 and resistor 511) of the activated commond circuit when relay 493 is deactivated connecting conductors 495 and 496. The selector-inhibitor gate cannot be reactivated then unless another memory or command circuit of another function has been activated and is producing a positive potential at transistor 427. The contact that recloses the break in conductor 428 closes slightly after the contact that connects conductors 496 and 495.

When conductors 435 and 499 are connected, relay 513, which is connected to the positive 25 volt source 415 through conductor 517, is activated. Activation of relay 513 disconnects conductors 519 and 523 from conductors 521 and 525, respectively; and, conductors 519 and 523 are connected to conductors 504 and 502, respectively. Conductors 502 and 504 are connected to conductors 503 and 505, respectively, through contacts of relay 593. Conductors 503 and 505 will each be carrying one of four possible signals, which are: (1) no voltage; (2) a plus DC voltage; (3) a minus DC voltage; or (4) an AC voltage. Sixteen different combinations are possible; fifteen of which are used (a null voltage on both conductors 519 and 523 is not used). The particular combination of each function command circuit selects the particular function of the underwater command circuit for activation.

Conductor 500 (on activation of relay 493) is connected to conductor 501 and will transmit a positive, negative or AC voltage signal to the underwater command system depending on the positioning of the toggle switch 401. When switch 401 is activated, in addition to pulsing the memory circuit, it activates relay 527 and contact 428 connecting conductor 403 to conductor 501.

It should be noted that only that portion of the circuit to the left of and excluded by broken line 529 is preferably produced fifteen times where as the portion to the right and the selector inhibitor gate are produced once for each group of 15 function command circuits. There are preferably two groups of 15 function command circuits. Thus, six wires plus a wire from common (not shown in FIG. 13) are connected to the underwater command system.

When relay 513 is not activated by a function command signal, conductors 519 and 523 are carrying sensor signals from underwater sensing devices such as position sensors (FIGS. 12a and 12b) depth readings, compass, etc. Each conductor 519 and 523 alternately carries two signals, one positive and one negative. While relay 513 is deactivated conductor 519 is connected to conductor 521 and conductor 523 is connected to conductor 525. The positive and negative sensor signals are passed through vibrating contacts 531 and 533 of relay 543 to indicators 535, 536, 537, and 538. One pair of indicators (535 and 537) reads positive signals and the other pair (536 and 538) reads negative signals, indicators 535 and 537 being connected by conductor 539 to a negative 25 volt source while indicators 536 and 538 are connected by conductor 541 to a positive 25 volt source.

Relay 543 is rapidly activated and deactivated by a free-running oscillator that includes a capacitor 545, resistors 547, 549, 551 and transistors 553 and 555. The relay 543 which is connected through conductor 517 to the positive 25 volt source 415 is rapidly connected to and disconnected from common 435 by the rapid switching of transistor 555.

Figure 14:
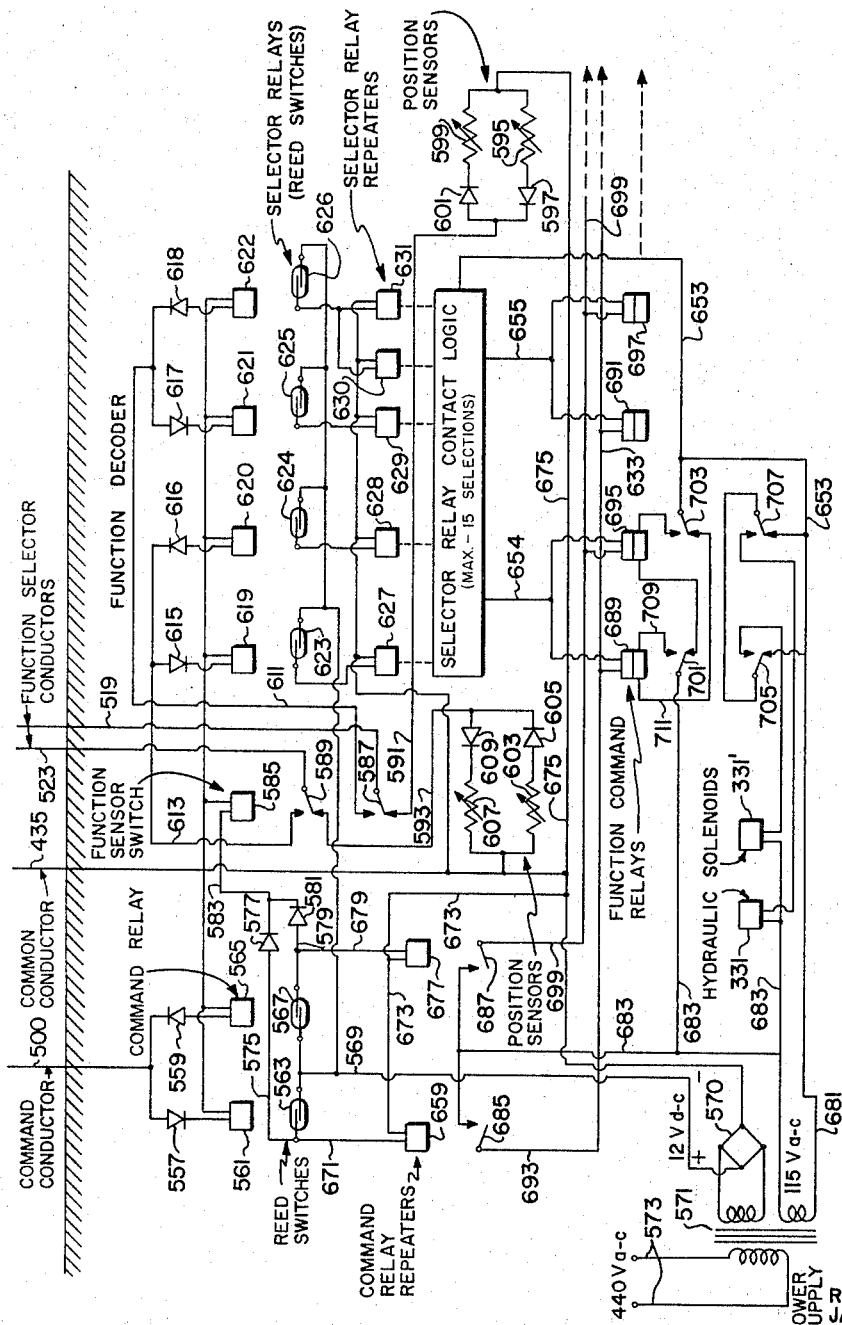
FIG. 14 is a diagram of the normally underwater portion of the command circuit.

FIG. 14 is a diagram of the below-surface portion of the gepud command system. The circuit is for fifteen function commands and four sensed functions. The circuit is preferably duplicated to obtain the total of thirty function commands and eight sensed functions. A positive or negative signal (depending upon the selection made at switch 401) is transmitted via the command conductor 500 and reaches diodes 557 and 559. If the signal is positive, it is passed by diode 557 and blocked by diode 559. If the signal is negative diode 557 blocks the signal and diode 559 passes it. Thus, a positive signal activates relay 561 and reed switch 563 while a negative signal activates relay 565 and reed switch 567. One side of the reed switches 563 and 567 is connected through a conductor 569 to a twelve volt DC supply 570 originating from the secondary coil of a transformer 571. Transformer 571 is connected to a 440 volt AC source 573 that furnishes power for the electric motor 75. The closing of either reed switch 563 and or 567 connects conductors 569 to either conductor 575 and diode 577 or conductor 579 and diode 581 supplying a voltage through conductor 583 and activating relay 585.

Before activation of relay 585, the two contacts 587 and 589 normally connect conductor 519 to conductor 591 and conductor 523 to conductor 593. Conductor 591 carries a positive signal from sensing device 595 through diode 597 and a negative signal from sensing device 599 through diode 601. When the contact 531 of the above-water system connects conductor 521 to indicator 535 the signal from sensing device 595 is read out on the above-water indicator. When the contact 531 connects conductor 521 to indicator 536, the negative signal from sensing device 599 is detected and read out. Sensors 603 and 607 with their associated diodes 605 and 609 act in a similar manner to pass positive and negative signals through conductor 593 to above water indicators 537 and 538.

After relay 585 is activated, contacts 587 and 589 connect conductors 519 and 523 to conductors 611 and 613, respectively. The sensor signals (from sensor devices 595, 599, 603, and 607) are temporarily disconnected. Conductor 613 is connected to diode 615, which passes a positive signal, and diode 616, which passes a negative signal. Conductor 611 is connected to diode 617, which passes a positive signal, and diode 618 which passes a negative signal. Diodes 615, 616, 617, and 618 control the activation of relays 619, 620, 621, and 622, respectively. The following table indicates the possible combinations for activating the relays 619 through 622 depending on the signal combinations carried by the function selection conductors 519 and 523. The signal combination depends upon which one of the fifteen function command circuits was selected. In the table 0, +, −, ± indicate null, positive DC, negative DC, and AC, respectively. There are preferably fifteen more above-water circuits to control a duplicate of the circuit shown in FIG. 14. Each relay 619 through 622 activates a connected reed switch 623, 624, 625, and 626.

Figure 15:
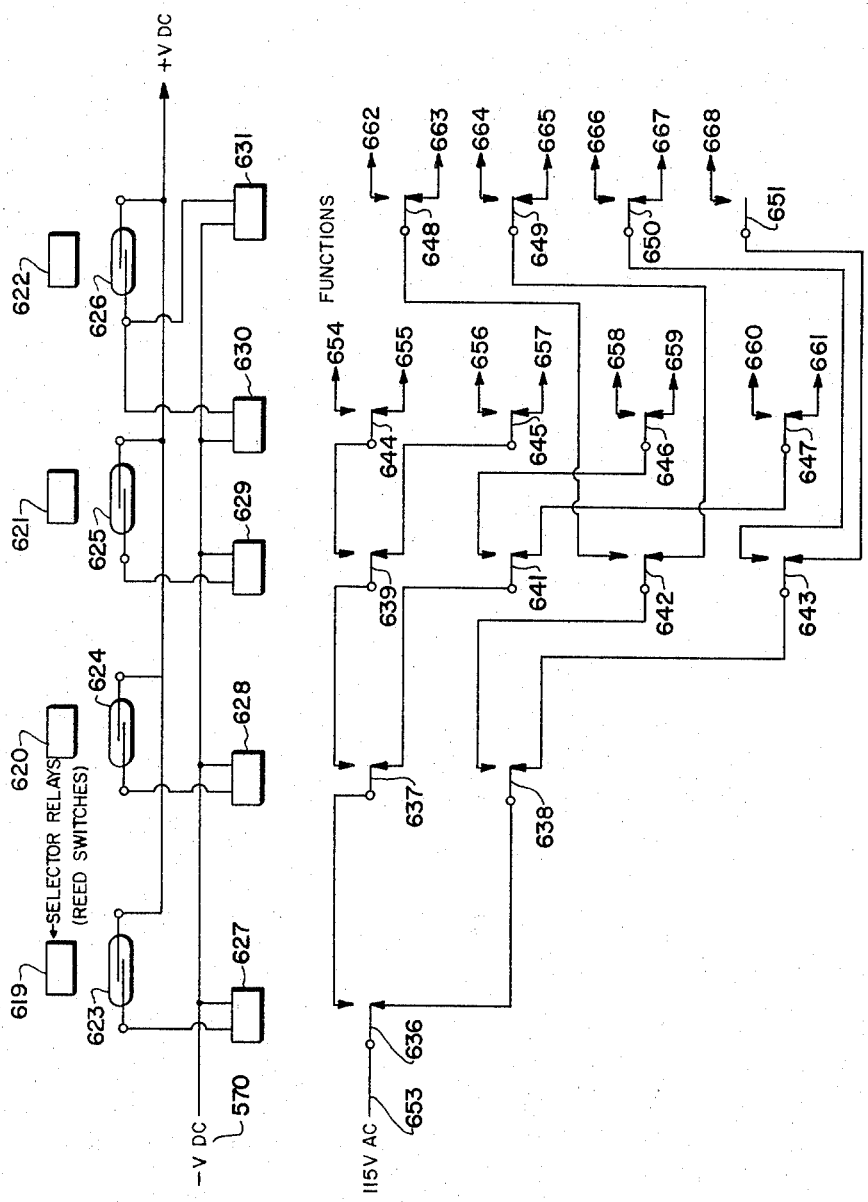
FIG. 15 is a diagram of the logic circuit or function selector circuit which is a part of the underwater portion of the command system.

The selector relays (or logic circuit) that determines which hydraulic solenoid (FIG. 11) is activated is shown in the diagram of FIG. 15. The selector switches 623–626 are preferably low inertia switches for low loads so they are connected to a group of repeater relays 627, 628, 629, 630, and 631 with the reed switch 626 activating two of the repeater relays 630 and 631 which will always act in unison.

| Circuit No. | Signal Carried By Conductor 523 | Signal Carried By Conductor 519 | Relays | | | |
|---|---|---|---|---|---|---|
| | | | 619 | 620 | 621 | 622 |
| 1 | + | 0 | ON | OFF | OFF | OFF |
| 2 | − | 0 | OFF | ON | OFF | OFF |
| 3 | 0 | + | OFF | OFF | ON | OFF |
| 4 | 0 | − | OFF | OFF | OFF | ON |
| 5 | ± | 0 | ON | ON | OFF | OFF |
| 6 | + | + | ON | OFF | ON | OFF |
| 7 | + | − | ON | OFF | OFF | ON |
| 8 | − | + | OFF | ON | ON | OFF |
| 9 | − | − | OFF | ON | OFF | ON |
| 10 | 0 | ± | OFF | OFF | ON | ON |
| 11 | ± | + | ON | ON | ON | OFF |
| 12 | ± | − | ON | ON | OFF | ON |
| 13 | + | ± | ON | OFF | ON | ON |
| 14 | − | ± | OFF | ON | ON | ON |
| 15 | ± | ± | ON | ON | ON | ON |

In the logic circuit, each repeater relay controls the contacts that are positioned directly in line below them in the diagram of FIG. 15. All of the contacts are shown with their associated repeater relay in the deactivated position and activation of the repeater relay activates all the associated contacts simultaneously. Contact 636 is connected to a 115 volt AC source by conductor 653. The conductor 653 passes through the logic circuit and is divided by the contacts 636 through 651 until there are fifteen terminal conductors 654 through 668. Only one of the terminal conductors is activated at any one time. Each conductor 654–668 is connected to two relays (four of such relays, 689, 695, 691, and 697 are shown in FIG. 14), one of which will be activated according to the polarity (positive or negative) of the command signal transmitted over the command conductor 500. The following table indicates the position of the contacts 636–651 according to the activation of relays 619–622 and the conductor 654–668 that is selected thereby.

| Relay | | | | Position of Contacts | | | | Conductor Selected |
|---|---|---|---|---|---|---|---|---|
| 619 | 620 | 621 | 622 | 636 | 637–638 | 639–643 | 644–651 | |
| ON | ON | ON | ON | UP | UP | UP | UP | 654 |
| ON | ON | ON | OFF | UP | UP | UP | DOWN | 655 |
| ON | ON | OFF | ON | UP | UP | DOWN | UP | 656 |
| ON | ON | OFF | OFF | UP | UP | DOWN | DOWN | 657 |
| ON | OFF | ON | ON | UP | DOWN | UP | UP | 658 |
| ON | OFF | ON | OFF | UP | DOWN | UP | DOWN | 659 |
| ON | OFF | OFF | ON | UP | DOWN | DOWN | UP | 660 |
| ON | OFF | OFF | OFF | UP | DOWN | DOWN | DOWN | 661 |
| OFF | ON | ON | ON | DOWN | UP | UP | UP | 662 |
| OFF | ON | ON | OFF | DOWN | UP | DOWN | DOWN | 663 |
| OFF | ON | OFF | ON | DOWN | UP | DOWN | UP | 664 |
| OFF | ON | OFF | OFF | DOWN | UP | DOWN | DOWN | 665 |
| OFF | OFF | ON | ON | DOWN | DOWN | UP | UP | 666 |
| OFF | OFF | ON | OFF | DOWN | DOWN | UP | DOWN | 667 |
| OFF | OFF | OFF | ON | DOWN | DOWN | DOWN | UP | 668 |

Referring again to FIG. 14, when reed switch 563 closes (the signal via command conductor 500 being positive), twelve volts DC is supplied to command relay repeater 659 from conductor 569, reed switch 563, and conductor 671. The circuit is completed through conductor 673 which is connected to a conductor 675 from the negative side of the DC source 570. Command relay repeater 677 (responsive to negative signals via command conductor 500) is connected to reed switch 567 by conductor 679 and is activated in the same manner as relay 659.

The transformer 573 also has a 115 volt AC power source 681. The power source 681 is connected by conductor 683 to contacts 685 and 687 or relays 659 and 677. Contact 685 connects conductor 683 to one side of a first coil of function command relays 689 and 691 (and thirteen more function command relays not shown) through conductor 693; and, contact 687 connects the conductor 683 to one side of a first coil of function command relays 695 and 697 (and thirteen more function command relays not shown) through conductor 699. Conductor 683 is also connected to contact 701 of relay 689. The other side of the 115 volt source 681 is connected via conductor 653 to the logic circuit and to contact 703 of relay 695. (The description of function command relays 689 and 695 also applies to relays 691, 697 and thirteen other pairs of function command relays). Conductor 683 is also connected to one side of hydraulic solenoids 331 and 331'. Conductor 653 is also connected to one side of a second pair of contacts 705 and 707 of relays 689 and 695.

Assuming that the switch 401 of the above-water circuit is switched to positive DC, and an AC signal is transmitted through each of the conductors 519 and 523, the following events occur: (1) the logic circuit connects conductor 653 to conductor 654; (2) contact 685 is closed by relay 659 completing the circuit to activate the first coil and contact 701 of function command relay 689; (3) contact 701 connects conductor 709 (connected to one side of a second coil of relay 689) through conductor 683 to one side of power source 681. (The side of the second coil of relay 689 is already connected to the other side of power source 681 through conductor 711, contact 703 and conductor 653. This keeps relay 689 activated even though the connection through the logic circuit via conductor 654 is broken); (4) contact 705 closes and completes the circuit for hydraulic solenoid 331' through contact 707.

If the switch 401 of the above-water circuit is switched to negative DC, the same signal is transmitted over conductors 519 and 523 but relay 677 will close contact 687 activating relay 695 which is held in activated position in the same manner as relay 689. As long as switch 401 is switched or held in a particular position, the selected hydraulic solenoid below water continues to be activated. Deactivation occurs when switch 401 is returned to neutral and another pulse is passed through the circuit of FIG. 13. This ensures the selection of the proper conductor from the logic circuit but the relay 527 (FIG. 13) is not activated and the command conductor 500 is connected to an AC source by contact 528. An AC signal via conductor 500 momentarily activates both relays 689 and 695 interrupting the holding circuit. When the holding circuit is broken, both relays 689 and 695 are deactivated.

From the foregoing description, it is seen that the operator of the above-surface command system activates one or more of the switches 401 to control various elements of the below-surface gepud. Each signal is transmitted to a memory circuit which switches off an inhibitor gate unless a signal is already being transmitted over another parallel function command circuit. When the inhibitor gate switches off, a signal from the memory triggers a monopulse generator that connects various signals from the particular function command circuit to the below-water system. When selection of the proper function is made an activation occurs. Although the activation signal is a short pulse, the command and function operates as long as switch 401 is off-neutral. When simultaneous functions are switched, the priority arrangement of the potentiometer 420 operates and the memory holds the function command until the inhibitor gate switches off and allows the next highest priority function command to be connected. Several functions can be going on simultaneously until they are deactivated by the operator returning the proper switch 401 to the neutral position.

FIG. 16 is a block diagram showing the interrelationship of above-water circuits to below-water circuits. Three of the command-triggering-type circuits 701, 703, and 705 are shown. The block diagram emphasizes signal paths of the various circuit sections. Although the block diagram of FIG. 16 is quite specific to the preferred circuit described herein and can be closely compared to the circuits shown in FIGS. 13, 14, and 15, it is apparent that other circuits are also possible. The diagram of FIG. 16 is therefore provided with a separate set of numerals to emphasize the particular combination of general circuit types rather than the specific preferred circuits.

When the toggle switch 707 of function command circuit 701 is moved, a positive or negative activation signal (depending on the operator's choice) is transmitted to the command change gate 709 and the function relay 711. The command change gate 709 transmits the activation signal to the memory 713. Assuming that none of the other circuits have been activated, the memory 713 opens the selector and inhibitor gate 715 and the activation signal triggers the monopulse generator 717. The monopulse generator 717 closes the function relay 711 and a number of contacts are made and broken which accomplishes the following: (1) the selector and inhibitor gate is closed to block any signals that might exist in memories 719 and 721; (2) the signal from switch 707 that passes directly to relay 711 is connected to the below-water command function actuator and forward reverse selector 723; (3) the signal from the function selector code 725 is connected to sensor to function relay 727; (4) a signal is originated and held for resetting the memory 713 as soon as the function relay deactivates; and (5) the above-water sensor to function relay 727 is activated. The sensor to function relay 727 disconnects the sensor signals (originating the below-water sensors 729) from the oscillator 726 and sensor indicators 728—728 and connects the coded signal from the function selector code 725 to the below-water command system. When the command signal from switch 707 reaches the command function actuator and forward reverse selector 723, the below-water sensor to function relay 731 is activated disconnecting the sensor signals from sensors 729 and connecting the signals from the function selector code 725 to the function decoder 733. The function decoder 733 potentially activates one of a plurality of paired elements 735–736 while the command function actuator and forward reverse selector, selects one of the pair for actual actuation.

If switch 737 is moved while function relay 711 is on, the signal goes through the command change gate 739 to the memory flip-flop 719 but cannot get through the inhibitor gate 715 to the monopulse generator 741. As a result the memory continues to put out a signal. When function relay 711 deactivates, it allows the inhibitor gate 715 to be opened just after memory 713 is reset or turned off. The signal from switch 737 now can pass through the inhibitor gate 715, activate the monopulse generator 741 and then function relay 743.

If switches 737 and 745 are thrown simultaneously, and while function relay 711 is activated, the selector and inhibitor gate 715 blocks both signals. When function relay 711 is deactivated the gate opens and the signal from the memory 719 or 721 having the highest priority setting gets through. The other signal is held until the high-priority signal passes through its associated function relay and that function relay deactivates allowing the gate to be opened again. In the preferred embodiment the gate 715 will block signals from any of the other fourteen circuits if one signal is already in the process of being transmitted to the below-water systems.

Note that a function can be operating while being sensed. For example, if a signal is sent to the azimuth propeller 47, the compass reading (from a sensor) would be momentarily shut off, however, after the coded signal activates the propeller 47, the "function selector duty" of the conductors (519 and 523) is finished and the sensors are reconnected. Thus, change in compass heading may be observed until a desired heading is attained and then the switch (401) returned to neutral sending another code signal over the conductors (519 and 523) to shut off propeller 97.

It will be understood of course that, while the forms of the invention herein shown and described constitute preferred embodiments of the invention, it is not intended to illustrate all possible forms of the invention. It will also be understood that the words used are words of description rather than of limitation and that various changes may be made without departing from the spirit and scope of the invention herein disclosed.

What is claimed is:

1. In a cable-suspended underwater craft, having a frame mounted to pivot horizontally with respect to a yoke, said yoke being attached to the cable, a propulsion system comprising:
   (a) a main propeller mounted on the yoke at a point generally coincident with the applied cable force of the craft; and
   (b) a direction control propeller mounted on the frame and positioned to provide substantially rotational forces for the craft with respect to the cable axis.

2. In a cable-suspended underwater craft, said craft including visual and mechanal elements for performing manipulatory functions and having a frame pivotally mounted on a yoke, said yoke being attached to the cable, a propulsion system comprising:
   (a) a main propeller pivotally mounted on the yoke at a point generally coincident with the applied cable force of the craft, the rotation of said main propeller being reversible;
   (b) a direction control propeller mounted on the frame of the craft and positioned to provide substantially rotational forces for the craft with respect to the cable axis, the rotation of said direction control propeller being reversible; and
   (c) hydraulic power means for providing rotational movement to said main propeller and said direction control propeller.

3. In a remote controlled underwater manipulatory device, apparatus for supplying power to activate movable elements comprising:
   (a) a high-energy hydraulic pump connected to a high-energy discharge line;
   (b) control means in said high-energy discharge line for regulating the output of said high-energy hydraulic pump to provide a high-pressure, high-energy line and a low-pressure, low-energy line, said high- and low-pressure, high-energy lines connected to supply high-energy hydraulic fluid for activating a selected group of the various moveable elements;
   (c) a low hydraulic pump connected to a low-energy discharge line; and
   (d) control means in said low-energy discharge line for regulating the low-energy output of said low-energy hydraulic pump to provide a high-pressure low-energy line and a low-pressure, low-energy line, said high- and low-pressure, low-energy lines connected to supply low-energy hydraulic fluid for activating the remainder of the various movable elements.

4. In a remote controlled underwater manipulatory device, apparatus for supplying power to activate various moveable elements according to claim 3 wherein the high-pressure, low-energy hydraulic fluid line is connected to a plurality of pilot valves associated with said high-energy hydraulic fluid lines, said pilot valves controlling the flow of high-energy fluid for activating said selected group of moveable elements.

5. In a remote controlled underwater manipulatory device, apparatus for supplying power to activate various moveable elements according to claim 3 wherein the hydraulic fluid is supplied to fluid-pressure activated actuators connected to the moveable elements, each said actuator being connected to a sump by a return line and a pressure compensator positioned in said return line, said pressure compensator being adapted to maintain the lowest pressure of the hydraulic fluid above the surrounding environmental pressure.

6. In a remote controlled underwater manipulatory device, apparatus for supplying power to activate various moveable elements in accordance with claim 3 wherein the low-energy hydraulic fluid for actuating said remainder of the various moveable elements is controlled by electrically activated solenoid valves.

7. A control system for selectively activating a plurality of actuators on an underwater manipulatory device, comprising:
   (a) code generating means for producing a separate coded signal for each of the plurality of actuators;
   (b) decoding means connectable to said code generating means, said decoding means including circuitry for selecting and activating one of said plurality of actuators corresponding to said signal;
   (c) connecting means for connecting each coded signal to said decoding means as each said coded signal is selected by an operator;
   (d) inhibitor means positioned in said connecting means, said inhibitor means blocking coded signals originated by said operator when said decoding means is occupied by a coded signal and for passing a coded signal when said decoding means is unoccupied by a coded signal; and
   (e) storage means for holding coded signals blocked by said inhibitor means until said blocked signals are subsequently passed by said inhibitor means.

8. A control system for receiving information from an underwater manipulatory device and for selectively activating a plurality of actuators on said underwater manipulatory device, comprising:
   (a) a plurality of sensors positioned in said underwater manipulatory device;
   (b) an above-water station having a plurality of sensor indicators and an oscillator, said oscillator rapidly and sequentially connecting said plurality of sensors and plurality of indicators through a lesser number of conductors;
   (c) code generating means for producing a separate coded signal for each of said plurality of actuators;
   (d) decoding means connectable to said code generating means, said decoding means including circuitry for selecting and activating one of said plurality of actuators corresponding to each said separate coded signal;
   (e) relay means positioned between said plurality of sensors and plurality of sensor indicators and between said code generating means and decoding means, said relay means disconnecting said plurality of sensors from said plurality of sensor indicators and connecting each coded signal to said decoding means as each said coded signal is selected by an operator;

(f) inhibitor means positioned between said code generating means and said decoding means, said inhibitor means blocking coded signals originated by said operator when said decoding means is occupied by a coded signal and for passing a coded signal when said decoding means is unoccupied by a coded signal; and (g) storage means for holding coded signals blocked by said inhibitor means until said blocked signals are subsequently passed by said inhibitor means.

9. A control system for receiving information from a cable-suspended underwater manipulatory device and for selectively activating a plurality of actuators associated with said underwater manipulatory device, comprising:

(a) an above-water operator-attended station including:
  (i) a plurality of selector switches;
  (ii) a plurality of memory circuits, each connected to and activated by one of said plurality selector switches to produce a first signal;
  (iii) a plurality of monopulse generators, each connected to and activated by said first signal from one of said plurality of memories to produce a second signal;
  (iv) an inhibitor gate connected to said plurality of memories and said plurality of monopulse generators, said inhibitor gate blocking the first signals from said plurality of memories when any one of said plurality of monopulse generators is producing a second signal, and said inhibitor gate releasing said signals from said memories on a one-at-a-time basis when said plurality of monopulse generators are inactive;
  (v) a code generator connected to each one of six plurality of selector switches, said code generator supplying a separate coded signal for each selector switch;
  (vi) a plurality of sensor indicators and an oscillator, said oscillator rapidly and sequentially connecting said plurality of sensor indicators to a lesser number of sensory-function conductors passing through the cable to said underwater manipulatory device;
  (vii) a plurality of function relays each connected to and activated by the second signal from one of said plurality of monopulse generators, each said function relay when activated disconnecting said plurality of sensor relays from said conductors and connecting the associated coded signal to said sensory-function conductors and a command conductor; and (b) an underwater station including:
  (i) a plurality of sensors connected to said sensory function conductors;
  (ii) a function decoder connectable to said sensory-function conductors, said function decoder including a logic circuit for receiving the coded signals and for selecting and activating one of said plurality of actuators for each separately coded signal; and
  (iii) a relay connected to said command conductor, said relay disconnecting said plurality of sensors from said sensory-function conductors on receiving a signal through said command conductor and connecting said function decoder to said sensory-function conductors.

References Cited

UNITED STATES PATENTS

| | | | |
|---|---|---|---|
| 2,987,893 | 6/1961 | Robinson | 61—49 |
| 3,066,805 | 12/1962 | Sullivan | 214—1 |
| 3,165,899 | 1/1965 | Shatto | 61—69 |
| 3,247,979 | 4/1966 | Melton et al. | 214—1 |
| 3,280,991 | 10/1966 | Melton et al. | 214—1 |
| 3,291,321 | 12/1966 | Hamilton | 214—1 |

DAVID J. WILLIAMOWSKY, *Primary Examiner.*

J. KARL BELL, *Assistant Examiner.*

UNITED STATES PATENT OFFICE

CERTIFICATE OF CORRECTION

Patent No. 3,381,485　　　　　　　　　　　　　　May 7, 1968

Ralph K. Crooks et al.

It is certified that error appears in the above identified patent and that said Letters Patent are hereby corrected as shown below:

Column 6, line 31, "to" should read -- at --. Column 11, line 68, "formation" should read -- information --. Column 13, line 59, "portion" should read -- position --. Column 14, line 30, "where as" should read -- whereas --. Column 15, line 2, after "563" cancel "and".

Signed and sealed this 21st day of October 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents